United States Patent
Beard et al.

(10) Patent No.: US 12,258,896 B2
(45) Date of Patent: Mar. 25, 2025

(54) MULTI-FUNCTIONAL CATALYSTS FOR THE OXIDATION OF NO, THE OXIDATION OF NH$_3$ AND THE SELECTIVE CATALYTIC REDUCTION OF NOx

(71) Applicant: BASF MOBILE EMISSIONS CATALYSTS LLC, Iselin, NJ (US)

(72) Inventors: Kevin Beard, Iselin, NJ (US); Robert Dorner, Hannover (DE); Jan Martin Becker, Hannover (DE)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 556 days.

(21) Appl. No.: 17/594,809

(22) PCT Filed: Apr. 30, 2020

(86) PCT No.: PCT/EP2020/062117
§ 371 (c)(1),
(2) Date: Oct. 29, 2021

(87) PCT Pub. No.: WO2020/221891
PCT Pub. Date: Nov. 5, 2020

(65) Prior Publication Data
US 2022/0195907 A1    Jun. 23, 2022

(30) Foreign Application Priority Data

Apr. 30, 2019  (EP) ..................................... 19171851

(51) Int. Cl.
*F01N 3/20* (2006.01)
*B01J 21/06* (2006.01)
(Continued)

(52) U.S. Cl.
CPC .......... *F01N 3/2066* (2013.01); *B01J 21/063* (2013.01); *B01J 21/08* (2013.01); *B01J 23/6482* (2013.01);
(Continued)

(58) Field of Classification Search
CPC ............... F01N 3/2066; F01N 2570/14; F01N 2570/18; F01N 2590/08; B01J 35/19;
(Continued)

(56) References Cited

U.S. PATENT DOCUMENTS

2010/0257845 A1* 10/2010 Iwamoto ................ B01J 23/002
   60/299
2011/0286900 A1* 11/2011 Caudle ..................... B01J 35/19
   502/74
(Continued)

FOREIGN PATENT DOCUMENTS

| JP | 2018-526192 A | 9/2018 |
| WO | 2016/203253 A1 | 12/2016 |
| WO | 2018/224651 A2 | 12/2018 |

OTHER PUBLICATIONS

International Search Report dated Jun. 3, 2020, PCT/EP2020/062117.

*Primary Examiner* — Kenneth J Hansen
*Assistant Examiner* — Kelsey L Stanek
(74) *Attorney, Agent, or Firm* — DLA Piper LLP (US)

(57) ABSTRACT

The present disclosure relates to a catalyst for the oxidation of NO, for the oxidation of ammonia and for the selective catalytic reduction of NOx, the catalyst comprising a flow-through substrate, a first coating comprising one or more of a vanadium oxide and a zeolitic material comprising one or more of copper and iron, a second coating comprising a platinum group metal component supported on a non-zeolitic oxidic material and further comprising one or more of a vanadium oxide and a zeolitic material comprising one or (Continued)

more of copper and iron and a third coating comprising a platinum group metal component supported on an oxidic material. The present disclosure further relates to an exhaust gas treatment system comprising said catalyst.

15 Claims, 4 Drawing Sheets

(51) Int. Cl.
    *B01J 21/08*     (2006.01)
    *B01J 23/648*     (2006.01)
    *B01J 29/72*     (2006.01)
    *B01J 35/00*     (2006.01)
    *B01J 37/02*     (2006.01)

(52) U.S. Cl.
    CPC ............. *B01J 29/723* (2013.01); *B01J 35/19* (2024.01); *B01J 37/0215* (2013.01); *F01N 2570/14* (2013.01); *F01N 2570/18* (2013.01); *F01N 2590/08* (2013.01)

(58) Field of Classification Search
    CPC ...... B01J 21/063; B01J 21/08; B01J 23/6482; B01J 29/723; B01J 37/0215
    USPC .......................................................... 502/334
    See application file for complete search history.

(56) References Cited

U.S. PATENT DOCUMENTS

2016/0367973 A1     12/2016     Larsson et al.
2016/0367974 A1     12/2016     Larsson
2018/0283250 A1     10/2018     Chen et al.

\* cited by examiner

MULTI-FUNCTIONAL CATALYSTS FOR THE OXIDATION OF NO, THE OXIDATION OF NH₃ AND THE SELECTIVE CATALYTIC REDUCTION OF NOx

This application is a national stage filing under 35 U.S.C. § 371 of International Application No. PCT/EP2020/062117, filed on Apr. 30, 2020, which claims the benefit of priority to European Application No. 19171851.9, filed Apr. 30, 2019; the disclosure of each of these applications are each incorporated herein by reference in their entirety.

The present invention relates to a catalyst for the oxidation of NO, for the oxidation of ammonia and for the selective catalytic reduction of NOx comprising three coatings on a substrate, to a method for the treatment of an exhaust gas using said catalyst, to an exhaust gas treatment system comprising said catalyst and to a method for preparing a catalyst for the oxidation of NO, for the oxidation of ammonia and for the selective catalytic reduction of NOx.

US 2016/0367973 discloses catalyst articles having a first zone containing a first SCR catalyst and a second zone containing an ammonia slip catalyst and US 2016/0367974 discloses catalyst articles having an ammonia slip catalyst and a second catalyst, such as a diesel oxidation catalyst, a selective catalytic reduction/passive NOx adsorber or a three-way conversion catalyst for example. However, the catalyst stated in US 2016/0367973 is not optimized in regard to NO oxidation to increase the $NO_2$ portion of the exhaust gas entering the CSF. Furthermore, where the SCR and the oxidation functionality are mixed, the catalyst can yield high $N_2O$ levels via unselective DeNOx. Having a diesel oxidation catalyst, a selective catalytic reduction/passive NOx adsorber or a three-way conversion catalyst as is stated in US2016/0367974 for example would also result in high $N_2O$ selectivity due to unselective oxidation of $NH_3$, which can slip from the upstream SCR.

Therefore, it was an object of the present invention to provide a catalyst for the oxidation of NO, for the oxidation of ammonia and for the selective catalytic reduction of NOx which exhibits great catalytic activity ($NH_3$ oxidation, NO oxidation and NOx conversion) while minimizing the nitrous oxide ($N_2O$) formation. Surprisingly, it was found that the catalyst for the oxidation of NO, for the oxidation of ammonia and for the selective catalytic reduction of NOx according to the present invention permits to obtain great catalytic activity ($NH_3$ oxidation, NO oxidation and NOx conversion) while reducing the nitrous oxide ($N_2O$) formation.

Therefore, the present invention relates to a catalyst for the oxidation of NO, for the oxidation of ammonia and for the selective catalytic reduction of NOx comprising
  (i) a flow-through substrate comprising an inlet end, an outlet end, a substrate axial length extending from the inlet end to the outlet end and a plurality of passages defined by internal walls of the flow-through substrate extending therethrough, wherein the interface between the passages and the internal walls is defined by the surface of the internal walls;
  (ii) a first coating comprising one or more of a vanadium oxide and a zeolitic material comprising one or more of copper and iron;
  (iii) a second coating comprising a platinum group metal component supported on a non-zeolitic oxidic material and further comprising one or more of a vanadium oxide and a zeolitic material comprising one or more of copper and iron;
  (iv) a third coating comprising a platinum group metal component supported on an oxidic material;
  wherein the third coating is disposed on the surface of the internal walls over z % of the axial length of the substrate from the outlet end to the inlet end, with z being in the range of from 20 to 80;
  wherein the second coating extends over y % of the axial length of the substrate from the inlet end to the outlet end and is disposed on the surface of the internal walls, with y being in the range of from 20 to 80;
  wherein the first coating extends over x % of the axial length of the substrate from the inlet end to the outlet end and is disposed on the second coating and on the third coating, with x being in the range of from 95 to 100.

It is preferred that x is in the range of from 98 to 100, more preferably in the range of from 99 to 100.

It is preferred that y is in the range of from 20 to (100−z), more preferably y is (100−z). There is preferably no gap between the second coating and the third coating.

It is preferred that z is in the range of from 30 to 70, more preferably in the range of from 40 to 60, more preferably in the range of from 45 to 55. It is more preferred that y is in the range of from 20 to (100−z), more preferably y is (100−z) and that z is in the range of from 30 to 70, more preferably in the range of from 40 to 60, more preferably in the range of from 45 to 55. It is more preferred that y is (100−z) and that z is in the range of from 45 to 55.

It is preferred that y is in the range of from 30 to 70, more preferably in the range of from 40 to 60, more preferably in the range of from 45 to 55, and that z is in the range of from 30 to 70, more preferably in the range of from 40 to 60, more preferably in the range of from 45 to 55. It is preferred that there is a gap between the second coating and the third coating or alternatively it is preferred that there is an overlap of the second coating onto the third coating.

It is preferred that the first coating comprises a zeolitic material comprising one or more of copper and iron.

It is preferred that the zeolitic material comprised in the first coating has a framework type selected from the group consisting of AEI, GME, CHA, MFI, BEA, FAU, MOR, a mixture of two or more thereof and a mixed type of two or more thereof, more preferably selected from the group consisting of AEI, GME, CHA, BEA, FAU, MOR, a mixture of two or more thereof and a mixed type of two or more thereof, more preferably selected from the group consisting of AEI, CHA, BEA, a mixture of two or more thereof and a mixed type of two or more thereof. It is more preferred that the zeolitic material comprised in the first coating has a framework type CHA or AEI, more preferably a framework type CHA.

It is preferred that from 95 to 100 weight-%, more preferably from 98 to 100 weight-%, more preferably from 99 to 100 weight-%, of the framework structure of the zeolitic material consist to Si, Al, O, and optionally P, wherein in the framework structure, the molar ratio of Si to Al, calculated as molar $SiO_2:Al_2O_3$, more preferably is in the range of from 2:1 to 50:1, more preferably in the range of from 4:1 to 40:1, more preferably in the range of from 10:1 to 40:1, more preferably in the range of from 15:1 to 40:1, more preferably in the range of from 15:1 to 25:1.

It is preferred that the zeolitic material comprised in the first coating comprises copper, wherein the amount of copper comprised in the zeolitic material, calculated as CuO, more preferably is in the range of from 1 to 10 weight-%, more preferably in the range of from 2 to 8 weight-%, more preferably in the range of from 3 to 6 weight-%, more preferably in the range of from 4.5 to 6 weight-%, based on the total weight of the zeolitic material. It is more preferred that the amount of iron, calculated as $Fe_2O_3$, comprised in the zeolitic material of the first coating, is in the range of from 0 to 0.01 weight-%, more preferably in the range of from 0 to 0.001 weight-%, more preferably in the range of from 0 to 0.0001 weight-%, based on the total weight of the zeolitic material. In other words, it is preferred that the first coating is substantially free, more preferably free, of iron.

It is preferred that the zeolitic material comprised in the first coating comprises iron, wherein the amount of iron comprised in the zeolitic material, calculated as $Fe_2O_3$, more preferably is in the range of from 0.1 to 10.0 weight-%, more preferably in the range of from 1.0 to 7.0 weight-%, more preferably in the range of from 2.5 to 5.5 weight-%, based on the total weight of the zeolitic material. It is more preferred that from 95 to 100 weight-%, more preferably from 98 to 100 weight-%, more preferably from 99 to 100 weight-%, of the framework structure of the zeolitic material consist to Si, Al, O, and optionally P, wherein in the framework structure, the molar ratio of Si to Al, calculated as $SiO_2:Al_2O_3$, more preferably is in the range of from 2:1 to 55:1, more preferably in the range of from 4:1 to 50:1, more preferably in the range of from 10:1 to 45:1, more preferably in the range of from 15:1 to 40:1. It is conceivable that when iron is present in the zeolitic material, the zeolitic material may have a framework type BEA or MFI.

It is preferred that the first coating comprises the zeolitic material at a loading in the range of from 0.5 to 4 $g/in^3$, more preferably in the range of from 0.75 to 3.5 $g/in^3$, more preferably in the range of from 0.8 to 3 $g/in^3$, more preferably in the range of from 0.8 to 2.5 $g/in^3$.

It is preferred that the zeolitic material comprised in the first coating, more preferably having a framework type CHA, has a mean crystallite size of at least 0.5 micrometer, more preferably in the range of from 0.5 to 1.5 micrometers, more preferably in the range of from 0.6 to 1.0 micrometer, more preferably in the range of from 0.6 to 0.8 micrometer, determined via scanning electron microscopy.

It is preferred that the first coating further comprises an oxidic binder, wherein the binder more preferably comprises one or more of zirconia, alumina, titanic, silica, and a mixed oxide comprising two or more of Zr, Al, Ti, and Si, more preferably comprises one or more of alumina and zirconia, more preferably comprises zirconia.

It is preferred that the first coating comprises the oxidic binder at an amount in the range of from 0.5 to 10 weight-%, more preferably in the range of from 2 to 8 weight-%, more preferably in the range of from 3 to 6 weight-%, based on the total weight of the zeolitic material of the first coating.

It is preferred that the first coating comprises the oxidic binder at a loading in the range of from 0.01 to 0.2 $g/in^3$, more preferably in the range of from 0.02 to 0.15 $g/in^3$, more preferably in the range of from 0.03 to 0.12 $g/in^3$.

As to the first coating, it is preferred that it comprises a zeolitic material, more preferably a zeolitic material having a framework type AEI or CHA, comprising Cu and more preferably further comprising an oxidic binder as defined in the foregoing.

Therefore, the present invention preferably relates to a catalyst for the oxidation of NO, for the oxidation of ammonia and for the selective catalytic reduction of NOx, comprising
(i) a flow-through substrate comprising an inlet end, an outlet end, a substrate axial length extending from the inlet end to the outlet end and a plurality of passages defined by internal walls of the flow-through substrate extending therethrough, wherein the interface between the passages and the internal walls is defined by the surface of the internal walls;
(ii) a first coating comprising a zeolitic material comprising Cu, more preferably a zeolitic material having a framework type AEI or CHA, and the first coating more preferably further comprising an oxidic binder as defined in the foregoing;
(iii) a second coating comprising a platinum group metal component supported on a non-zeolitic oxidic material and further comprising one or more of a vanadium oxide and a zeolitic material comprising one or more of copper and iron;
(iv) a third coating comprising a platinum group metal component supported on an oxidic material;
wherein the third coating is disposed on the surface of the internal walls over z % of the axial length of the substrate from the outlet end to the inlet end, with z being in the range of from 20 to 80;
wherein the second coating extends over y % of the axial length of the substrate from the inlet end to the outlet end and is disposed on the surface of the internal walls, with y being in the range of from 20 to 80;
wherein the first coating extends over x % of the axial length of the substrate from the inlet end to the outlet end and is disposed on the second coating and on the third coating, with x being in the range of from 95 to 100.

In the context of the present invention, it is preferred that from 95 to 100 weight-%, more preferably from 98 to 100 weight-%, more preferably from 99 to 100 weight-%, of the first coating consist of a zeolitic material comprising one or more of copper and iron, and preferably an oxidic binder as defined in the foregoing.

As an alternative, it is preferred that the first coating comprises a vanadium oxide, wherein the vanadium oxide more preferably is one or more of vanadium (V) oxide, a vanadium (IV) oxide and a vanadium (III) oxide, wherein the vanadium oxide optionally comprises one or more of tungsten, iron and antimony. It is preferred that the vanadium oxide is supported on an oxidic material comprising one or more of titanium, silicon and zirconium, more preferably comprising one or more of titanium and silicon. It is more preferred that the oxidic material is one or more of titania and silica, more preferably titania and silica, wherein more preferably from 80 to 95 weight-% of the oxidic material consist of titania.

It is preferred that the first coating comprises the vanadium oxide, calculated as $V_2O_5$, at a loading in the range of from 1 to 6 $g/in^3$, more preferably in the range of from 2 to 4 $g/in^3$.

It is preferred that from 95 to 100 weight-%, more preferably from 98 to 100 weight-%, more preferably from 99 to 100 weight-%, of the first coating consist of vanadium oxide supported on the oxidic material.

In the context of the present invention, it is preferred that from 0 to 0.001 weight-%, preferably from 0 to 0.0001 weight-%, more preferably from 0 to 0.00001 weight-%, of the first coating consist of palladium, more preferably of palladium, platinum and rhodium, more preferably of palladium, platinum, rhodium, osmium and iridium, more preferably of noble metals. In other words, it is preferred that the first coating is substantially free, more preferably free, of palladium, more preferably of palladium, platinum and rhodium, more preferably of palladium, platinum, rhodium, osmium and iridium, more preferably of noble metals.

As to the second coating, it is preferred that the platinum group metal component comprised in said second coating is one or more of platinum, palladium and rhodium, more preferably one or more of platinum and palladium. It is more preferred that the platinum group metal component comprised in the second coating is platinum.

It is preferred that the second coating comprises the platinum group metal component at an amount in the range of from 0.1 to 2 weight-%, more preferably in the range of from 0.2 to 1 weight-%, more preferably in the range of from 0.3 to 0.6 weight-%, based on the weight of the non-zeolitic oxidic material of the second coating.

It is preferred that the second coating comprises the platinum group metal component at a loading, calculated as elemental platinum group metal, in the range of from 0.3 to 10 g/ft$^3$, more preferably in the range of from 0.5 to 5 g/ft$^3$, more preferably in the range of from 1 to 3 g/ft$^3$.

It is preferred that the non-zeolitic oxidic material onto which the platinum group metal component of the second coating is supported comprises, more preferably consists of, one or more of alumina, zirconia, titania, silica, ceria, and a mixed oxide comprising two or more of Al, Zr, Ti, Si, and Ce, more preferably one or more of alumina, zirconia, titania and silica, more preferably one or more of titania and silica.

It is preferred that the second coating comprises the non-zeolitic oxidic material at a loading in the range of from 0.1 to 3 g/in$^3$, more preferably in the range of from 0.15 to 1.5 g/in$^3$, more preferably in the range of from 0.2 to 0.5 g/in$^3$.

It is preferred that from 90 to 100 weight-%, more preferably from 95 to 100 weight-%, more preferably from 99 to 100 weight-%, of the non-zeolitic oxidic material of the second coating consist of titania, and optionally silica. It is more preferred that from 60 to 100 weight-%, more preferably from 80 to 100 weight-%, more preferably from 85 to 95 weight-%, of the non-zeolitic oxidic material of the second coating consists of titania and that from 0 to 40 weight-%, more preferably 0 to 20 weight-%, more preferably from 5 to 15 weight-%, of the non-zeolitic oxidic material of the second coating consist of silica.

It is preferred that the second coating comprises a zeolitic material comprising one or more of copper and iron.

It is preferred that the zeolitic material comprised in the second coating has a framework type selected from the group consisting of AEI, GME, CHA, MFI, BEA, FAU, MOR, a mixture of two or more thereof and a mixed type of two or more thereof, more preferably selected from the group consisting of AEI, GME, CHA, BEA, FAU, MOR, a mixture of two or more thereof and a mixed type of two or more thereof, more preferably selected from the group consisting of AEI, CHA, BEA, a mixture of two or more thereof and a mixed type of two or more thereof. It is more preferred that the zeolitic material of the second coating has a framework type CHA or AEI, more preferably a framework type CHA.

It is preferred that the zeolitic material of the second coating comprises copper, wherein the amount of copper comprised in the zeolitic material, calculated as CuO, more preferably is in the range of from 1 to 10 weight-%, more preferably in the range of from 2 to 8 weight-%, more preferably in the range of from 3 to 6 weight-%, more preferably in the range of from 4.5 to 6 weight-%, based on the total weight of the zeolitic material.

It is more preferred that the amount of iron comprised in the zeolitic material of the second coating, calculated as Fe$_2$O$_3$, is in the range of from 0 to 0.01 weight-%, more preferably in the range of from 0 to 0.001 weight-%, more preferably in the range of from 0 to 0.0001 weight-%, based on the total weight of the zeolitic material. In other words, it is preferred that the second coating is substantially free, more preferably free, of iron.

It is preferred that from 95 to 100 weight-%, more preferably from 98 to 100 weight-%, more preferably from 99 to 100 weight-%, of the framework structure of the zeolitic material of the second coating consist to Si, Al, O, and optionally P, wherein in the framework structure, the molar ratio of Si to Al, calculated as SiO$_2$:Al$_2$O$_3$, more preferably is in the range of from 2:1 to 50:1, more preferably in the range of from 4:1 to 40:1, more preferably in the range of from 10:1 to 40:1, more preferably in the range of from 15:1 to 40:1, more preferably in the range of from 15:1 to 25:1.

It is preferred that the zeolitic material comprised in the second coating comprises iron, wherein the amount of iron comprised in the zeolitic material, calculated as Fe$_2$O$_3$, more preferably is in the range of from 0.1 to 10.0 weight-%, more preferably in the range of from 1.0 to 7.0 weight %, more preferably in the range of from 2.5 to 5.5 weight-%, based on the total weight of the zeolitic material. It is more preferred that from 95 to 100 weight-%, more preferably from 98 to 100 weight-%, more preferably from 99 to 100 weight-%, of the framework structure of the zeolitic material consist to Si, Al, O, and optionally P, wherein in the framework structure, the molar ratio of Si to Al, calculated as SiO$_2$:Al$_2$O$_3$, more preferably is in the range of from 2:1 to 55:1, more preferably in the range of from 4:1 to 50:1, more preferably in the range of from 10:1 to 45:1, more preferably in the range of from 15:1 to 40:1. It is conceivable that when iron is present in the zeolitic material, the zeolitic material may have a framework type BEA or MFI.

In the context of the present invention, it is preferred that the second coating comprises the zeolitic material at a loading in the range of from 0.5 to 4 g/in$^3$, more preferably in the range of from 0.75 to 3 g/in$^3$, more preferably in the range of from 0.8 to 2.5 g/in$^3$.

It is preferred that the zeolitic material comprised in the second coating, more preferably having a framework type CHA, has a mean crystallite size of at least 0.5 micrometer, more preferably in the range of from 0.5 to 1.5 micrometers, more preferably in the range of from 0.6 to 1.0 micrometer, more preferably in the range of from 0.6 to 0.8 micrometer determined via scanning electron microscopy.

It is preferred that the second coating further comprises an oxidic binder. It is preferred that the binder comprises one or more of zirconia, alumina, titania, silica, and a mixed oxide comprising two or more of Zr, Al, Ti and Si, more preferably one or more of alumina and zirconia, more preferably zirconia.

It is preferred that the second coating comprises the oxidic binder at an amount in the range of from 0.5 to 10 weight-%, more preferably in the range of from 2 to 8 weight-%, more preferably in the range of from 3 to 6 weight-%, based on the total weight of the zeolitic material of the second coating.

It is preferred that the second coating more preferably comprises the oxidic binder at a loading in the range of from 0.01 to 0.25 g/in$^3$, more preferably in the range of from 0.02 to 0.1 g/in$^3$.

As to the second coating, it is preferred that it comprises the platinum group metal component supported on the non-zeolitic oxidic material, the zeolitic material comprising one or more of copper and iron, and preferably an oxidic binder as defined in the foregoing.

Therefore, the present invention preferably relates to a catalyst for the oxidation of NO, for the oxidation of ammonia and for the selective catalytic reduction of NOx, comprising (i) a flow-through substrate comprising an inlet end, an outlet end, a substrate axial length extending from the inlet end to the outlet end and a plurality of passages defined by internal walls of the flow-through substrate extending therethrough, wherein the interface between the passages and the internal walls is defined by the surface of the internal walls;

(ii) a first coating comprising a zeolitic material comprising Cu, more preferably a zeolitic material having a framework type AEI or CHA, and the first coating more preferably further comprising an oxidic binder as defined in the foregoing;

(iii) a second coating comprising a platinum group metal component supported on a non-zeolitic oxidic material and further comprising a zeolitic material comprising one or more of copper and iron, the second coating more preferably further comprising an oxidic binder as defined in the foregoing;

(iv) a third coating comprising a platinum group metal component supported on an oxidic material;

wherein the third coating is disposed on the surface of the internal walls over z % of the axial length of the substrate from the outlet end to the inlet end, with z being in the range of from 20 to 80;

wherein the second coating extends over y % of the axial length of the substrate from the inlet end to the outlet end and is disposed on the surface of the internal walls, with y being in the range of from 20 to 80;

wherein the first coating extends over x % of the axial length of the substrate from the inlet end to the outlet end and is disposed on the second coating and on the third coating, with x being in the range of from 95 to 100.

In the context of the present invention, it is preferred that from 90 to 100 weight-%, more preferably from 95 to 100 weight-%, more preferably from 98 to 100 weight-%, of the second coating consist of the platinum group metal component supported on the non-zeolitic oxidic material, the zeolitic material comprising one or more of copper and iron, and more preferably an oxidic binder as defined in the foregoing.

As an alternative, it is preferred that the second coating comprises a vanadium oxide, wherein the vanadium oxide is more preferably one or more of vanadium (V) oxide, a vanadium (IV) oxide and a vanadium (III) oxide, wherein the vanadium oxide optionally comprises one or more of tungsten, iron and antimony.

It is preferred that the vanadium oxide is supported on an oxidic material comprising one or more of titanium, silicon, tungsten, and zirconium, more preferably an oxidic material comprising one or more of titanium and silicon, more preferably titania and silica, wherein more preferably from 80 to 95 weight-% of the oxidic material consist of titania.

It is preferred that from 90 to 100 weight-%, more preferably from 95 to 100 weight-%, more preferably from 98 to 100 weight-%, more preferably from 99 to 100 weight-%, of the second coating consist of the platinum group metal component supported on the non-zeolitic oxidic material and the vanadium oxide supported on the oxidic material.

It is preferred that the second coating comprises the vanadium oxide, calculated as $V_2O_5$, at a loading in the range of from 1 to 6 $g/in^3$, more preferably in the range of from 2 to 4 $g/in^3$.

As to the platinum group metal component content, it is preferred that the second coating and the third coating together have a platinum group metal component loading in the catalyst, calculated as elemental platinum group metal, in the range of from 1 to 40 $g/ft^3$, more preferably in the range of from 2.7 to 25 $g/ft^3$, more preferably in the range of from 4.25 to 15 $g/ft^3$, more preferably in the range of from 5.5 to 10.5 $g/ft^3$.

It is preferred that the ratio of the loading of the platinum group metal component in the third coating relative to the loading of the platinum group metal component in the second coating is in the range of from 1:1 to 20:1, more preferably in the range of from 2:1 to 15:1, more preferably in the range of from 3:1 to 12:1, more preferably in the range of from 4:1 to 10:1, more preferably in the range of from 5:1 to 9:1.

As to the third coating, it is preferred that the platinum group metal component of the third coating is one or more of platinum, palladium and rhodium, more preferably one or more of platinum and palladium, more preferably platinum.

It is preferred that the third coating comprises the platinum group metal component at an amount in the range of from 0.5 to 2 weight-%, preferably from 0.6 to 1 weight-%, based on the weight of the oxidic material of the third coating.

It is preferred that the third coating comprises the platinum group metal component, calculated as elemental platinum group metal, at a loading in the range of from 5 to 40 $g/ft^3$, more preferably in the range of from 8 to 25 $g/ft^3$, more preferably in the range of from 10 to 18 $g/ft^3$.

It is preferred that the oxidic material supporting the platinum group metal component comprised in the third coating comprises, more preferably consists of, one or more of alumina, zirconia, titania, silica, ceria, and a mixed oxide comprising two or more of Al, Zr, Ti, Si and Ce, more preferably one or more of alumina, zirconia, titania and silica, more preferably one or more of titania and silica.

It is preferred that from 90 to 100 weight-%, more preferably from 95 to 100 weight-%, more preferably from 99 to 100 weight-%, of the oxidic material of the third coating consist of titania, and optionally silica.

It is preferred that from 60 to 100 weight-%, more preferably from 80 to 100 weight-%, more preferably from 85 to 95 weight-%, of the oxidic material of the third coating consists of titania and that from 0 to 40 weight-%, more preferably from 0 to 20 weight-%, more preferably from 5 to 15 weight-%, of the oxidic material of the third coating consist of silica.

It is preferred that the third coating comprises the oxidic material supporting the platinum group metal component at a loading in the range of from 0.25 to 3 $g/in^3$, more preferably in the range of from 0.5 to 2.5 $g/in^3$, more preferably in the range of from 0.75 to 2 $g/in^3$, more preferably in the range of from 0.8 to 1.5 $g/in^3$.

It is preferred that the third coating comprises an oxidic binder, wherein the oxidic binder more preferably comprises one or more of silica, zirconia, alumina, titania, and a mixed oxide comprising two or more of Zr, Al, Ti, and Si, more preferably comprises one or more of silica and alumina, more preferably silica.

It is preferred that the third coating comprises the oxidic binder at an amount in the range of from 1 to 7 weight-%, more preferably in the range of from 1.5 to 4 weight-%, based on the weight of the oxidic material of the third coating.

As to the third coating, it is preferred that it comprises the platinum group metal component supported on the oxidic material, wherein the platinum group metal component more preferably is platinum, and more preferably comprises an oxidic binder as defined in the foregoing.

Therefore, the present invention preferably relates to a catalyst for the oxidation of NO, for the oxidation of ammonia and for the selective catalytic reduction of NOx, comprising
  (i) a flow-through substrate comprising an inlet end, an outlet end, a substrate axial length extending from the inlet end to the outlet end and a plurality of passages defined by internal walls of the flow-through substrate extending therethrough, wherein the interface between the passages and the internal walls is defined by the surface of the internal walls;
  (ii) a first coating comprising a zeolitic material comprising Cu, more preferably a zeolitic material having a framework type AEI or CHA, and the first coating more preferably further comprising an oxidic binder as defined in the foregoing;
  (iii) a second coating comprising a platinum group metal component supported on a non-zeolitic oxidic material and further comprising a zeolitic material comprising one or more of copper and iron, the second coating more preferably further comprising an oxidic binder as defined in the foregoing;
  (iv) a third coating comprising a platinum group metal component supported on an oxidic material, wherein the platinum group metal component is platinum, the third coating more preferably further comprising an oxidic binder as defined in the foregoing;
  wherein the third coating is disposed on the surface of the internal walls over z % of the axial length of the substrate from the outlet end to the inlet end, with z being in the range of from 20 to 80;
  wherein the second coating extends over y % of the axial length of the substrate from the inlet end to the outlet end and is disposed on the surface of the internal walls, with y being in the range of from 20 to 80;
  wherein the first coating extends over x % of the axial length of the substrate from the inlet end to the outlet end and is disposed on the second coating and on the third coating, with x being in the range of from 95 to 100.

In the context of the present invention, it is preferred that from 90 to 100 weight-%, more preferably from 95 to 100 weight-%, more preferably from 99 to 100 weight-%, of the third coating consist of the platinum group metal component supported on the oxidic material, and more preferably an oxidic binder as defined in the foregoing.

It is preferred that at most 0.01 weight-%, more preferably from 0 to 0.01 weight-%, more preferably from 0 to 0.001 weight-%, more preferably from 0 to 0.0001 weight-%, of the third coating consist of a zeolitic material. In other words, it is preferred that the third coating is substantially free, more preferably free, of a zeolitic material.

It is preferred that at most 0.01 weight-%, more preferably from 0 to 0.01 weight-%, more preferably from 0 to 0.0001 weight-%, more preferably from 0 to 0.00001 weight-%, of the third coating consist of one or more vanadium oxides. In other words, it is preferred that the third coating is substantially free, more preferably free, of one or more vanadium oxides.

It is preferred that the third coating comprises, more preferably consists of, a diesel oxidation catalyst component.

It is preferred that the catalyst comprises the third coating at loading in the range of from 0.4 to 3.25 g/in$^3$, more preferably in the range of from 0.55 to 2.75 g/in$^3$, more preferably in the range of from 0.8 to 2.25 g/in$^3$, more preferably in the range of from 0.85 to 1.75 g/in$^3$.

It is preferred that the second coating comprises, more preferably consists of, one or more nitrogen oxide (NOx) reduction components and one or more ammonia oxidation (AMOx) components.

It is preferred that the catalyst comprises the second coating at a loading in the range of from 0.6 to 5.25 g/in$^3$, more preferably in the range of from 0.8 to 3.25 g/in$^3$, more preferably in the range of from 0.9 to 2.75 g/in$^3$.

It is preferred that the first coating comprises, more preferably consists of, a nitrogen oxide (NOx) reduction component.

It is preferred that the catalyst comprises the first coating at a loading in the range of from 0.6 to 5.25 g/in$^3$, more preferably in the range of from 0.8 to 3.25 g/in$^3$, more preferably in the range of from 0.9 to 2.75 g/in$^3$.

It is preferred that the flow-through substrate of the catalyst comprises a ceramic or metallic substance.

It is preferred that the flow-through substrate of the catalyst comprises, more preferably consists of, a ceramic substance, wherein the ceramic substance more preferably comprises, more preferably consists of, one or more of an alumina, a silica, a silicate, an aluminosilicate, more preferably a cordierite or a mullite, an aluminotitanate, a silicon carbide, a zirconia, a magnesia, preferably a spinel, and a titania, more preferably one or more of a silicon carbide and a cordierite, more preferably a cordierite. Alternatively, it is preferred that the flow-through substrate of the catalyst comprises, more preferably consists of, a metallic substance, wherein the metallic substance more preferably comprises, more preferably consists of, oxygen and one or more of iron, chromium, and aluminum.

It is preferred that the catalyst of the present invention consists of the flow-through substrate, the first coating, the second coating and the third coating.

The present invention further relates to a method for preparing a catalyst for the oxidation of NO, for the oxidation of ammonia and for the selective catalytic reduction of NOx, preferably the catalyst according to the present invention, comprising
  (a) providing an uncoated flow-through substrate, the substrate comprising an inlet end, an outlet end, a substrate axial length extending from the inlet end to the outlet end and a plurality of passages defined by internal walls of the substrate extending therethrough, wherein the interface between the passages and the internal walls is defined by the surface of the internal walls;
  (b) providing a slurry comprising a platinum group metal component, an oxidic material, and a solvent, disposing said slurry on the surface of the internal walls of the substrate, over z % of the substrate axial length from the outlet end to the inlet end, with z being in the range of from 20 to 80, calcining the slurry disposed on the substrate, obtaining a third coating disposed on the substrate;
  (c) providing a slurry comprising a platinum group metal component, a non-zeolitic oxidic material and one or more of a vanadium oxide and a zeolitic material comprising one or more of copper and iron, and a solvent, disposing said slurry on the surface of the internal walls over y % of the substrate axial length from the inlet end to the outlet end, with y being in the range of from 20 to 80, calcining the slurry disposed on the substrate, obtaining a second coating disposed on the substrate;

(d) providing a slurry comprising one or more of a vanadium oxide and a zeolitic material comprising one or more of copper and iron, and a solvent, disposing said slurry over x % of the substrate axial length on the second coating from the inlet end to the outlet end, with x being in the range of from 95 to 100, calcining the slurry disposed on the substrate, obtaining the catalyst for the oxidation of NO, for the oxidation of ammonia and for the selective catalytic reduction of NOx.

As to (b), it is preferred that it comprises (b.1) forming a slurry with an aqueous mixture of water, an alcohol, a platinum group metal precursor, more preferably of a platinum precursor, with an oxidic material, wherein the oxidic material more preferably is as defined in the foregoing, and more preferably adding a source of an oxidic binder, more preferably colloidal silica; wherein optionally adjusting the pH in the range of from 3 to 5 is performed, more preferably prior to the addition of the binder;

(b.2) disposing the slurry obtained in (b.1) on the surface of the internal walls of the substrate, over z % of the substrate axial length from the outlet end to the inlet end;

(b.3) optionally, drying the slurry disposed on the substrate obtained in (b.2), obtaining a dried slurry-treated substrate;

(b.4) calcining the slurry disposed on the substrate obtained in (b.2), or the dried slurry-treated substrate obtained in (b.3), in a gas atmosphere, more preferably having a temperature in the range of from 400 to 800° C., more preferably in the range of from 450 to 700° C., wherein the gas atmosphere more preferably comprises, more preferably is, one or more of air, lean air, and oxygen, more preferably air.

It is preferred that, according to (b.3), drying is performed in a gas atmosphere having a temperature in the range of from 90 to 180° C., more preferably in the range of from 110 to 130° C., wherein the gas atmosphere more preferably comprises, more preferably is, one or more of air, lean air, and oxygen, more preferably air.

It is preferred that, according to (b.3), drying is performed in a gas atmosphere for a duration in the range of from 10 minutes to 1.5 hours, more preferably in the range of from 20 minutes to 50 minutes, wherein the gas atmosphere more preferably comprises, more preferably is, one or more of air, lean air, and oxygen, more preferably air.

It is preferred that, according to (b.4), calcining is performed in a gas atmosphere having a temperature in the range of from 500 to 650° C., wherein the gas atmosphere more preferably comprises, more preferably is, one or more of air, lean air, and oxygen, more preferably air.

As to (c), it is preferred that it comprises (c.1) forming a slurry with an aqueous mixture of water, a platinum group metal precursor, more preferably of a platinum precursor, and a non-zeolitic oxidic material, and a zeolitic material, more preferably having a framework type CHA, and comprising one or more of copper and iron, and more preferably adding a precursor of an oxidic binder, more preferably a Zr-containing precursor, more preferably a zirconyl acetate; or forming a slurry with a source of water, a platinum group metal precursor, more preferably of a platinum precursor, and a non-zeolitic oxidic material, and a vanadium oxide, more preferably vanadium oxalate, and more preferably adding an oxidic material, more preferably with a dispersant;

(c.2) disposing the slurry obtained in (c.1) on the surface of the internal walls over y % of the substrate axial length from the inlet end to the outlet end;

(c.3) optionally, drying the slurry disposed on the substrate obtained in (c.2), obtaining a dried slurry-treated substrate;

(c.4) calcining the slurry disposed on the substrate obtained in (c.2), or the dried slurry-treated substrate obtained in (c.3), in a gas atmosphere, more preferably having a temperature in the range of from 300 to 600° C., more preferably in the range of from 350 to 550° C., wherein the gas atmosphere more preferably comprises, more preferably is, one or more of air, lean air, and oxygen, more preferably air.

According to (c.3), it is preferred that drying is performed in a gas atmosphere having a temperature in the range of from 90 to 180° C., more preferably in the range of from 120 to 140° C., wherein the gas atmosphere more preferably comprises, more preferably is, one or more of air, lean air, and oxygen, more preferably air.

According to (c.3), it is preferred that drying is performed in a gas atmosphere for a duration in the range of from 10 minutes to 1.5 hours, more preferably in the range of from 20 minutes to 50 minutes, wherein the gas atmosphere more preferably comprises, more preferably is, one or more of air, lean air, and oxygen, more preferably air.

According to (c.4), it is preferred that calcining is performed in a gas atmosphere having a temperature in the range of from 350 to 500° C., wherein the gas atmosphere more preferably comprises, more preferably is, one or more of air, lean air, and oxygen, more preferably air.

As to (d), it is preferred that it comprises (d.1) forming a slurry comprising water and a zeolitic material, more preferably having a framework type CHA, and comprising one or more of copper and iron, and a precursor of an oxidic binder, more preferably a Zr-containing precursor, more preferably zirconyl acetate; or forming a slurry with water and a source of a vanadium oxide, more preferably vanadium oxalate, and more preferably adding an oxidic material, more preferably with a dispersant;

(d.2) disposing the obtained slurry over x % of the substrate axial length on the second coating from the inlet end to the outlet end, with x more preferably being in the range of from 98 to 100, more preferably in the range of from 99 to 100;

(d.3) optionally drying the slurry disposed on the substrate obtained in (d.2), obtaining a dried slurry-treated substrate;

(d.4) calcining the slurry disposed on the substrate obtained in (d.2), or the dried slurry-treated substrate obtained in (d.3), in a gas atmosphere, more preferably having a temperature in the range of from 300 to 600° C., more preferably in the range of from 350 to 550° C., wherein the gas atmosphere more preferably comprises, more preferably is, one or more of air, lean air, and oxygen, more preferably air.

According to (d.3), it is preferred that drying is performed in a gas atmosphere having a temperature in the range of from 90 to 180° C., more preferably in the range of from 110 to 130° C., wherein the gas atmosphere more preferably comprises, more preferably is, one or more of air, lean air, and oxygen, more preferably air.

According to (d.4), it is preferred that calcining is performed in a gas atmosphere having a temperature in the range of from 350 to 500° C., wherein the gas atmosphere more preferably comprises, more preferably is, one or more of air, lean air, and oxygen, more preferably air.

It is preferred that y is in the range of from 20 to (100−z), more preferably y is (100−z), and that z is in the range of from 30 to 70, more preferably in the range of from 40 to 60, more preferably in the range of from 45 to 55.

It is preferred that disposing in one or more of (b), (c) and (d), more preferably disposing in (b), (c) and (d), is performed by spraying the slurry onto the substrate or by immersing the substrate into the slurry, more preferably by immersing the substrate into the slurry.

In the context of the present invention, it is preferred that the method consists of (a), (b), (c) and (d).

The present invention further relates to a catalyst for the oxidation of NO, for the oxidation of ammonia and for the selective catalytic reduction of NOx, preferably the catalyst for the oxidation of NO, for the oxidation of ammonia and for the selective catalytic reduction of NOx according to the present invention, obtainable or obtained by the process according to the present invention.

The present invention further relates to a use of a catalyst for the oxidation of NO, for the oxidation of ammonia and for the selective catalytic reduction of NOx according to the present invention for the simultaneous selective catalytic reduction of NOx, the oxidation of ammonia and the oxidation of NO.

The present invention further relates to an exhaust gas treatment system for treating an exhaust gas stream exiting an internal combustion engine, preferably a diesel engine, said exhaust gas treatment system having an upstream end for introducing said exhaust gas stream into said exhaust gas treatment system, wherein said exhaust gas treatment system comprises the catalyst according to the present invention and one or more of a selective catalytic reduction catalyst, an ammonia oxidation catalyst, and a diesel particulate filter. It is conceivable that the exhaust gas treatment system of the present invention may comprise a diesel oxidation catalyst. It is however believed that the presence of such a diesel oxidation catalyst would not be necessary in view of the use of the catalyst according to the present invention in the exhaust gas treatment system of the present invention.

It is preferred that the system comprises a first selective catalytic reduction catalyst comprising a coating disposed on a substrate and the catalyst according to the present invention, wherein the first selective catalytic reduction catalyst is located downstream of the inlet end of the exhaust gas treatment system, wherein the catalyst according to the present invention is located downstream of the first selective catalytic reduction catalyst. As to the first selective catalytic reduction catalyst, it is preferred that it comprises one or more of a vanadium oxide and a zeolitic material comprising one or more of copper and iron.

It is preferred that the system further comprises a diesel particulate filter, wherein said filter is located downstream of the catalyst according to the present invention.

It is preferred that the system further comprises a second selective catalytic reduction catalyst and an ammonia oxidation catalyst, wherein the second selective catalytic reduction catalyst is located downstream of the diesel particulate filter, and wherein the ammonia oxidation catalyst is located downstream of the second selective catalytic reduction.

It is preferred that the system further comprises a first injector for injecting a fluid into the exhaust gas stream exiting the engine, said injector being located upstream of the first selective catalytic reduction catalyst, and downstream of the upstream end of the exhaust gas treatment system, wherein the fluid more preferably is an aqueous urea solution. It is preferred that the system further comprises a second injector for injecting a fluid into the exhaust gas stream exiting the diesel particulate filter, said injector being located upstream of the second selective catalytic reduction catalyst, and downstream of the diesel particulate filter, wherein the fluid more preferably is an aqueous urea solution.

It is more preferred that the system consists of the first selective catalytic reduction catalyst, the catalyst according to the present invention, and preferably a diesel particulate filter as defined in the foregoing, and more preferably a second selective catalytic reduction catalyst as defined in the foregoing and an ammonia oxidation catalyst as defined in the foregoing, and more preferably a first and a second injector as defined in in the foregoing.

The present invention further relates to a method for the simultaneous selective catalytic reduction of NOx, the oxidation of ammonia and the oxidation of nitrogen monoxide, the method comprising
(1) providing a gas stream comprising one or more of NOx, ammonia and nitrogen monoxide;
(2) contacting the gas stream provided in (1) with a catalyst for the oxidation of NO, for the oxidation of ammonia and for the selective catalytic reduction of NOx according to the present invention.

The present invention is illustrated by the following set of embodiments and combinations of embodiments resulting from the dependencies and back-references as indicated. In particular, it is noted that in each instance where a range of embodiments is mentioned, for example in the context of a term such as "The catalyst of any one of embodiments 1 to 4", every embodiment in this range is meant to be explicitly disclosed for the skilled person, i.e. the wording of this term is to be understood by the skilled person as being synonymous to "The catalyst of any one of embodiments 1, 2, 3 and 4". Further, it is explicitly noted that the following set of embodiments is not the set of claims determining the extent of protection, but represents a suitably structured part of the description directed to general and preferred aspects of the present invention.

1. A catalyst for the oxidation of NO, for the oxidation of ammonia and for the selective catalytic reduction of NOx, comprising
   (i) a flow-through substrate comprising an inlet end, an outlet end, a substrate axial length extending from the inlet end to the outlet end and a plurality of passages defined by internal walls of the flow-through substrate extending therethrough, wherein the interface between the passages and the internal walls is defined by the surface of the internal walls;
   (ii) a first coating comprising one or more of a vanadium oxide and a zeolitic material comprising one or more of copper and iron;
   (iii) a second coating comprising a platinum group metal component supported on a non-zeolitic oxidic material and further comprising one or more of a vanadium oxide and a zeolitic material comprising one or more of copper and iron;
   (iv) a third coating comprising a platinum group metal component supported on an oxidic material;
   wherein the third coating is disposed on the surface of the internal walls over z % of the axial length of the substrate from the outlet end to the inlet end, with z being in the range of from 20 to 80;
   wherein the second coating extends over y % of the axial length of the substrate from the inlet end to the outlet end and is disposed on the surface of the internal walls, with y being in the range of from 20 to 80;

wherein the first coating extends over x % of the axial length of the substrate from the inlet end to the outlet end and is disposed on the second coating and on the third coating, with x being in the range of from 95 to 100.

2. The catalyst of embodiment 1, wherein x is in the range of from 98 to 100, preferably in the range of from 99 to 100.
3. The catalyst of embodiment 1 or 2, wherein y is in the range of from 20 to (100−z), preferably y is (100−z), wherein z preferably is in the range of from 30 to 70, more preferably in the range of from 40 to 60, more preferably in the range of from 45 to 55.
4. The catalyst of embodiment 1 or 2, wherein y is in the range of from 30 to 70, preferably in the range of from 40 to 60, more preferably in the range of from 45 to 55, and wherein z is in the range of from 30 to 70, preferably in the range of from 40 to 60, more preferably in the range of from 45 to 55.
5. The catalyst of any one of embodiments 1 to 4, wherein the first coating comprises a zeolitic material comprising one or more of copper and iron.
6. The catalyst of any one of embodiments 1 to 5, wherein the zeolitic material comprised in the first coating has a framework type selected from the group consisting of AEI, GME, CHA, MFI, BEA, FAU, MOR, a mixture of two or more thereof and a mixed type of two or more thereof, preferably selected from the group consisting of AEI, GME, CHA, BEA, FAU, MOR, a mixture of two or more thereof and a mixed type of two or more thereof, more preferably selected from the group consisting of AEI, CHA, BEA, a mixture of two or more thereof and a mixed type of two or more thereof, wherein the zeolitic material comprised in the first coating more preferably has a framework type CHA or AEI, more preferably CHA.
7. The catalyst of any one of embodiments 1 to 6, wherein from 95 to 100 weight-%, preferably from 98 to 100 weight-%, more preferably from 99 to 100 weight-%, of the framework structure of the zeolitic material consist to Si, Al, O, and optionally P, wherein in the framework structure, the molar ratio of Si to Al, calculated as molar $SiO_2:Al_2O_3$, preferably is in the range of from 2:1 to 50:1, more preferably in the range of from 4:1 to 40:1, more preferably in the range of from 10:1 to 40:1, more preferably in the range of from 15:1 to 40:1, more preferably in the range of from 15:1 to 25:1.
8. The catalyst of any one of embodiments 1 to 7, wherein the zeolitic material comprised in the first coating comprises copper, wherein the amount of copper comprised in the zeolitic material, calculated as CuO, preferably is in the range of 1 to 10 weight-%, more preferably in the range of from 2 to 8 weight-%, more preferably in the range of from 3 to 6 weight-%, more preferably in the range of from 4.5 to 6 weight-%, based on the total weight of the zeolitic material, and wherein the amount of iron, calculated as $Fe_2O_3$, comprised in the zeolitic material of the first coating, preferably is in the range of from 0 to 0.01 weight-%, more preferably in the range of from 0 to 0.001 weight-%, more preferably in the range of from 0 to 0.0001 weight-%, based on the total weight of the zeolitic material.
9. The catalyst of any one of embodiments 1 to 7, wherein the zeolitic material comprised in the first coating comprises iron, wherein the amount of iron comprised in the zeolitic material, calculated as $Fe_2O_3$, preferably is in the range of from 0.1 to 10.0 weight-%, more preferably in the range of from 1.0 to 7.0 weight-%, more preferably in the range of from 2.5 to 5.5 weight-%, based on the total weight of the zeolitic material, and wherein preferably from 95 to 100 weight-%, more preferably from 98 to 100 weight-%, more preferably from 99 to 100 weight-%, of the framework structure of the zeolitic material consist to Si, Al, O, and optionally P, wherein in the framework structure, the molar ratio of Si to Al, calculated as $SiO_2:Al_2O_3$, preferably is in the range of from 2:1 to 55:1, more preferably in the range of from 4:1 to 50:1, more preferably in the range of from 10:1 to 45:1, more preferably in the range of from 15:1 to 40:1.
10. The catalyst of any one of embodiments 1 to 9, wherein the first coating comprises the zeolitic material at a loading in the range of from 0.5 to 4 $g/in^3$, preferably in the range of from 0.75 to 3.5 $g/in^3$, more preferably in the range of from 0.8 to 3 $g/in^3$, more preferably in the range of from 0.8 to 2.5 $g/in^3$.
11. The catalyst of any one of embodiments 1 to 10, wherein the zeolitic material comprised in the first coating, preferably having a framework type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.
12. The catalyst of any one of embodiments 1 to 11, wherein the first coating further comprises an oxidic binder, wherein the binder preferably comprises one or more of zirconia, alumina, titania, silica, and a mixed oxide comprising two or more of Zr, Al, Ti, and Si, more preferably comprises one or more of alumina and zirconia, more preferably comprises zirconia;

wherein the first coating more preferably comprises the oxidic binder at an amount in the range of from 0.5 to 10 weight-%, preferably in the range of from 2 to 8 weight-%, more preferably in the range of from 3 to 6 weight-%, based on the total weight of the zeolitic material of the first coating;

wherein the first coating more preferably comprises the oxidic binder at a loading in the range of from 0.01 to 0.2 $g/in^3$, more preferably in the range of from 0.02 to 0.15 $g/in^3$, more preferably in the range of from 0.03 to 0.12 $g/in^3$.

13. The catalyst of any one of embodiments 1 to 12, wherein from 95 to 100 weight-%, preferably from 98 to 100 weight-%, more preferably from 99 to 100 weight-%, of the first coating consist of a zeolitic material comprising one or more of copper and iron, and preferably an oxidic binder as defined in embodiment 12.
14. The catalyst of any one of embodiments 1 to 12, wherein the first coating comprises a vanadium oxide, wherein the vanadium oxide preferably is one or more of vanadium (V) oxide, a vanadium (IV) oxide and a vanadium (III) oxide, wherein the vanadium oxide optionally comprises one or more of tungsten, iron and antimony.
15. The catalyst of embodiment 14, wherein the vanadium oxide is supported on an oxidic material comprising one or more of titanium, silicon and zirconium, preferably comprising one or more of titanium and silicon, wherein the oxidic material is one or more of titania and silica, more preferably titania and silica, wherein preferably from 80 to 95 weight-% of the oxidic material consist of titania.
16. The catalyst of embodiment 14 or 15, wherein the first coating comprises the vanadium oxide, calculated as $V_2O_5$, at a loading in the range of from 1 to 6 g/in$^3$, preferably in the range of from 2 to 4 g/in$^3$.
17. The catalyst of embodiment 15 or 16, wherein from 95 to 100 weight-%, preferably from 98 to 100 weight-%, more preferably from 99 to 100 weight-%, of the first coating consist of vanadium oxide supported on the oxidic material.
18. The catalyst of any one of embodiments 1 to 17, wherein from 0 to 0.001 weight-%, preferably from 0 to 0.0001 weight-%, preferably from 0 to 0.00001 weight-%, of the first coating consist of palladium, preferably of palladium, platinum and rhodium, more preferably of palladium, platinum, rhodium, osmium and iridium, more preferably of noble metals.
19. The catalyst of any one of embodiments 1 to 18, wherein the platinum group metal component comprised in the second coating is one or more of platinum, palladium and rhodium, preferably one or more of platinum and palladium, wherein the platinum group metal component more preferably is platinum.
20. The catalyst of any one of embodiments 1 to 19, wherein the second coating comprises the platinum group metal component at a loading, calculated as elemental platinum group metal, in the range of from 0.3 to 10 g/ft$^3$, preferably in the range of from 0.5 to 5 g/ft$^3$, more preferably in the range of from 1 to 3 g/ft$^3$;
wherein the second coating preferably comprises the platinum group metal component at an amount in the range of from 0.1 to 2 weight-%, more preferably in the range of from 0.2 to 1 weight-%, more preferably in the range of from 0.3 to 0.6 weight-%, based on the weight of the non-zeolitic oxidic material of the second coating.
21. The catalyst of any one of embodiments 1 to 20, wherein the non-zeolitic oxidic material onto which the platinum group metal component of the second coating is supported comprises, preferably consists of, one or more of alumina, zirconia, titania, silica, ceria, and a mixed oxide comprising two or more of Al, Zr, Ti, Si, and Ce, preferably one or more of alumina, zirconia, titania and silica, more preferably one or more of titania and silica; wherein the second coating preferably comprises the non-zeolitic oxidic material at a loading in the range of from 0.1 to 3 g/in$^3$, more preferably in the range of from 0.15 to 1.5 g/in$^3$, more preferably in the range of from 0.2 to 0.5 g/in$^3$.
22. The catalyst of embodiment 21, wherein from 90 to 100 weight-%, preferably from 95 to 100 weight-%, more preferably from 99 to 100 weight-%, of the non-zeolitic oxidic material of the second coating consist of titania, and optionally silica;
wherein preferably from 60 to 100 weight-%, more preferably from 80 to 100 weight-%, more preferably from 85 to 95 weight-%, of the non-zeolitic oxidic material of the second coating consists of titania and wherein preferably from 0 to 40 weight-%, more preferably 0 to 20 weight-%, more preferably from 5 to 15 weight-%, of the non-zeolitic oxidic material of the second coating consist of silica.
23. The catalyst of any one of embodiments 1 to 22, wherein the second coating comprises a zeolitic material comprising one or more of copper and iron.
24. The catalyst of any one of embodiments 1 to 23, wherein the zeolitic material comprised in the second coating has a framework type selected from the group consisting of AEI, GME, CHA, MFI, BEA, FAU, MOR, a mixture of two or more thereof and a mixed type of two or more thereof, preferably selected from the group consisting of AEI, GME, CHA, BEA, FAU, MOR, a mixture of two or more thereof and a mixed type of two or more thereof, more preferably selected from the group consisting of AEI, CHA, BEA, a mixture of two or more thereof and a mixed type of two or more thereof, wherein the zeolitic material of the second coating more preferably has a framework type CHA or AEI, more preferably CHA.
25. The catalyst of any one of embodiments 1 to 24, wherein the zeolitic material of the second coating comprises copper, wherein the amount of copper comprised in the zeolitic material, calculated as CuO, preferably is in the range of from 1 to 10 weight-%, more preferably in the range of from 2 to 8 weight-%, more preferably in the range of from 3 to 6 weight-%, more preferably in the range of from 4.5 to 6 weight-%, based on the total weight of the zeolitic material.
26. The catalyst of any one of embodiments 1 to 25, wherein from 95 to 100 weight-%, preferably from 98 to 100 weight-%, more preferably from 99 to 100 weight-%, of the framework structure of the zeolitic material of the second coating consist to Si, Al, O, and optionally P, wherein in the framework structure, the molar ratio of Si to Al, calculated as $SiO_2:Al_2O_3$, preferably is in the range of from 2:1 to 50:1, more preferably in the range of from 4:1 to 40:1, more preferably in the range of from 10:1 to 40:1, more preferably in the range of from 15:1 to 40:1, more preferably in the range of from 15:1 to 25:1.
27. The catalyst of embodiment 25 or 26, wherein the amount of iron comprised in the zeolitic material of the second coating, calculated as $Fe_2O_3$, is in the range of from 0 to 0.01 weight-%, preferably in the range of from 0 to 0.001 weight-%, more preferably in the range of from 0 to 0.0001 weight-%, based on the total weight of the zeolitic material.
28. The catalyst of any one of embodiments 1 to 26, wherein the zeolitic material comprised in the second coating comprises iron, wherein the amount of iron comprised in the zeolitic material, calculated as $Fe_2O_3$, preferably is in the range of from 0.1 to 10.0 weight-%, more preferably in the range of from 1.0 to 7.0 weight-%, more preferably in the range of from 2.5 to 5.5 weight-%, based on the total weight of the zeolitic material, and wherein preferably from 95 to 100 weight-%, more preferably from 98 to 100 weight-%, more preferably from 99 to 100 weight-%, of the framework structure of the zeolitic material consist to Si, Al, O, and optionally P, wherein in the framework structure, the molar ratio of Si to Al, calculated as $SiO_2:Al_2O_3$, preferably is in the range of from 2:1 to 55:1, more preferably in the range of from 4:1 to 50:1, more preferably in the range of from 10:1 to 45:1, more preferably in the range of from 15:1 to 40:1.
29. The catalyst of any one of embodiments 1 to 28, wherein the second coating comprises the zeolitic material at a loading in the range of from 0.5 to 4 g/in$^3$, preferably in the range of from 0.75 to 3 g/in³, more preferably in the range of from 0.8 to 2.5 g/in³.

30. The catalyst of any one of embodiments 1 to 29, wherein the zeolitic material comprised in the second coating, preferably having a framework type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.

31. The catalyst of any one of embodiments 1 to 30, wherein the second coating further comprises an oxidic binder, wherein the binder preferably comprises one or more of zirconia, alumina, titania, silica, and a mixed oxide comprising two or more of Zr, Al, Ti and Si, more preferably one or more of alumina and zirconia, more preferably zirconia;
wherein the second coating more preferably comprises the oxidic binder at an amount in the range of from 0.5 to 10 weight-%, more preferably in the range of from 2 to 8 weight %, more preferably in the range of from 3 to 6 weight-%, based on the total weight of the zeolitic material of the second coating;
wherein the second coating more preferably comprises the oxidic binder at a loading in the range of from 0.01 to 0.25 g/in³, more preferably in the range of from 0.02 to 0.1 g/in³.

32. The catalyst of any one of embodiments 1 to 31, wherein from 90 to 100 weight-%, preferably from 95 to 100 weight-%, more preferably from 98 to 100 weight-%, of the second coating consist of the platinum group metal component supported on the non-zeolitic oxidic material, the zeolitic material comprising one or more of copper and iron, and preferably an oxidic binder as defined in embodiment 31.

33. The catalyst of any one of embodiments 1 to 31, wherein the second coating comprises a vanadium oxide, wherein the vanadium oxide is preferably one or more of vanadium (V) oxide, a vanadium (IV) oxide and a vanadium (III) oxide, wherein the vanadium oxide optionally comprises one or more of tungsten, iron and antimony.

34. The catalyst of embodiment 33, wherein the vanadium oxide is supported on an oxidic material comprising one or more of titanium, silicon, tungsten, and zirconium, preferably an oxidic material comprising one or more of titanium and silicon, more preferably titania and silica, wherein preferably from 80 to 95 weight-% of the oxidic material consist of titania.

35. The catalyst of embodiment 34, wherein from 90 to 100 weight-%, preferably from 95 to 100 weight-%, more preferably from 98 to 100 weight-%, more preferably from 99 to 100 weight-%, of the second coating consist of the platinum group metal component supported on the non-zeolitic oxidic material and vanadium oxide supported on the oxidic material.

36. The catalyst of any one of embodiments 33 to 35, wherein the second coating comprises the vanadium oxide, calculated as $V_2O_5$, at a loading in the range of from 1 to 6 g/in³, preferably in the range of from 2 to 4 g/in³.

37. The catalyst of any one of embodiments 1 to 36, wherein the second coating and the third coating together have a platinum group metal component loading in the catalyst, calculated as elemental platinum group metal, in the range of from 1 to 40 g/ft³, preferably in the range of from 2.7 to 25 g/ft³, more preferably in the range of from 4.25 to 15 g/ft³, more preferably in the range of from 5.5 to 10.5 g/ft³.

38. The catalyst of any one of embodiments 1 to 37, wherein the platinum group metal component of the third coating is one or more of platinum, palladium and rhodium, preferably one or more of platinum and palladium, more preferably platinum.

39. The catalyst of any one of embodiments 1 to 38, wherein the third coating comprises the platinum group metal component, calculated as elemental platinum group metal, at a loading in the range of from 5 to 40 g/ft³, preferably in the range of from 8 to 25 g/ft³, more preferably in the range of from 10 to 18 g/ft³;
wherein the third coating comprises the platinum group metal at an amount in the range of from 0.5 to 2 weight-%, preferably from 0.6 to 1 weight-%, based on the weight of the oxidic material of the third coating.

40. The catalyst of any one of embodiments 1 to 39, wherein the oxidic material supporting the platinum group metal component comprised in the third coating comprises, preferably consists of, one or more of alumina, zirconia, titania, silica, ceria, and a mixed oxide comprising two or more of Al, Zr, Ti, Si and Ce, preferably one or more of alumina, zirconia, titania and silica, more preferably one or more of titania and silica.

41. The catalyst of embodiment 40, wherein from 90 to 100 weight-%, preferably from 95 to 100 weight-%, more preferably from 99 to 100 weight-%, of the oxidic material of the third coating consist of titania, and optionally silica;
wherein preferably from 60 to 100 weight-%, more preferably from 80 to 100 weight-%, more preferably from 85 to 95 weight-%, of the oxidic material of the third coating consists of titania and wherein preferably from 0 to 40 weight-%, more preferably from 0 to 20 weight-%, more preferably from 5 to 15 weight-%, of the oxidic material of the third coating consist of silica.

42. The catalyst of any one of embodiments 1 to 41, wherein the third coating comprises the oxidic material supporting the platinum group metal component at a loading in the range of from 0.25 to 3 g/in³, preferably in the range of from 0.5 to 2.5 g/in³, more preferably in the range of from 0.75 to 2 g/in³, more preferably in the range of from 0.8 to 1.5 g/in³.

43. The catalyst of any one of embodiments 1 to 42, wherein the third coating comprises an oxidic binder, wherein the oxidic binder preferably comprises one or more of silica, zirconia, alumina, titania, and a mixed oxide comprising two or more of Zr, Al, Ti, and Si, more preferably comprises one or more of silica and alumina, more preferably silica;
wherein the third coating preferably comprises the oxidic binder at an amount in the range of from 1 to 7 weight-%, more preferably in the range of from 1.5 to 4 weight-%, based on the weight of the oxidic material of the third coating.

44. The catalyst of any one of embodiments 1 to 43, wherein from 90 to 100 weight-%, preferably from 95 to 100 weight-%, more preferably from 99 to 100 weight-%, of the third coating consist of the platinum group metal component supported on the oxidic material, and preferably an oxidic binder as defined in embodiment 43.

45. The catalyst of any one of embodiments 1 to 44, wherein at most 0.01 weight-%, preferably from 0 to 0.01 weight-%, more preferably from 0 to 0.001 weight-%, more preferably from 0 to 0.0001 weight-%, of the third coating consist of a zeolitic material, wherein the third coating more preferably is free of a zeolitic material.
46. The catalyst of any one of embodiments 1 to 45, wherein at most 0.01 weight-%, preferably from 0 to 0.01 weight-%, more preferably from 0 to 0.0001 weight-%, more preferably from 0 to 0.00001 weight-%, of the third coating consist of one or more vanadium oxides, wherein the third coating more preferably is free of vanadium oxides.
47. The catalyst of any one of embodiments 1 to 46, wherein the third coating comprises, preferably consists of, a diesel oxidation catalyst component.
48. The catalyst of any one of embodiments 1 to 47, wherein the catalyst comprises the third coating at loading in the range of from 0.4 to 3.25 $g/in^3$, preferably in the range of from 0.55 to 2.75 $g/in^3$, more preferably in the range of from 0.8 to 2.25 $g/in^3$, more preferably in the range of from 0.85 to 1.75 $g/in^3$.
49. The catalyst of any one of embodiments 1 to 48, wherein the second coating comprises, preferably consists of, one or more nitrogen oxide (NOx) reduction components and one or more ammonia oxidation (AMOx) components.
50. The catalyst of any one of embodiments 1 to 49, wherein the catalyst comprises the second coating at a loading in the range of from 0.6 to 5.25 $g/in^3$, preferably in the range of from 0.8 to 3.25 $g/in^3$, more preferably in the range of from 0.9 to 2.75 $g/in^3$.
51. The catalyst of any one of embodiments 1 to 50, wherein the first coating comprises, preferably consists of, a nitrogen oxide (NOx) reduction component.
52. The catalyst of any one of embodiments 1 to 50, wherein the catalyst comprises the first coating at a loading in the range of from 0.6 to 5.25 $g/in^3$, preferably in the range of from 0.8 to 3.25 $g/in^3$, more preferably in the range of from 0.9 to 2.75 $g/in^3$.
53. The catalyst of any one of embodiments 1 to 52, wherein the flow-through substrate of the catalyst comprises a ceramic or metallic substance.
54. The catalyst of any one of embodiments 1 to 53, wherein the flow-through substrate of the catalyst comprises, preferably consists of, a ceramic substance, wherein the ceramic substance preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite.
55. The catalyst of any one of embodiments 1 to 53, wherein the flow-through substrate of the catalyst comprises, preferably consists of, a metallic substance, wherein the metallic substance preferably comprises, more preferably consists of, oxygen and one or more of iron, chromium, and aluminum.
56. The catalyst of any one of embodiments 1 to 55, consisting of the flow-through substrate, the first coating, the second coating and the third coating.
57. A method for preparing a catalyst for the oxidation of NO, for the oxidation of ammonia and for the selective catalytic reduction of NOx, preferably the catalyst according to any one of embodiments 1 to 56, comprising
  (a) providing an uncoated flow-through substrate, the substrate comprising an inlet end, an outlet end, a substrate axial length extending from the inlet end to the outlet end and a plurality of passages defined by internal walls of the substrate extending therethrough, wherein the interface between the passages and the internal walls is defined by the surface of the internal walls;
  (b) providing a slurry comprising a platinum group metal component, an oxidic material, and a solvent, disposing said slurry on the surface of the internal walls of the substrate, over z % of the substrate axial length from the outlet end to the inlet end, with z being in the range of from 20 to 80, calcining the slurry disposed on the substrate, obtaining a third coating disposed on the substrate;
  (c) providing a slurry comprising a platinum group metal component, a non-zeolitic oxidic material and one or more of a vanadium oxide and a zeolitic material comprising one or more of copper and iron, and a solvent, disposing said slurry on the surface of the internal walls over y % of the substrate axial length from the inlet end to the outlet end, with y being in the range of from 20 to 80, calcining the slurry disposed on the substrate, obtaining a second coating disposed on the substrate;
  (d) providing a slurry comprising one or more of a vanadium oxide and a zeolitic material comprising one or more of copper and iron, and a solvent, disposing said slurry over x % of the substrate axial length on the second coating from the inlet end to the outlet end, with x being in the range of from 95 to 100, calcining the slurry disposed on the substrate, obtaining the catalyst for the oxidation of NO, for the oxidation of ammonia and for the selective catalytic reduction of NOx.
58. The method of embodiment 57, wherein (b) comprises
  (b.1) forming a slurry with an aqueous mixture of water, an alcohol, a platinum group metal precursor, preferably of a platinum precursor, with an oxidic material, wherein the oxidic material preferably is as defined in embodiment 40 or 41, and preferably adding a source of an oxidic binder, more preferably colloidal silica; wherein optionally adjusting the pH in the range of from 3 to 5 is performed, preferably prior to the addition of the binder;
  (b.2) disposing the slurry obtained in (b.1) on the surface of the internal walls of the substrate, over z % of the substrate axial length from the outlet end to the inlet end;
  (b.3) optionally, drying the slurry disposed on the substrate obtained in (b.2), obtaining a dried slurry-treated substrate;
  (b.4) calcining the slurry disposed on the substrate obtained in (b.2), or the dried slurry-treated substrate obtained in (b.3), in a gas atmosphere, preferably having a temperature in the range of from 400 to 800° C., more preferably in the range of from 450 to 700° C., wherein the gas atmosphere preferably comprises, more preferably is, one or more of air, lean air, and oxygen, more preferably air.
59. The method of embodiment 58, wherein, according to (b.3), drying is performed in a gas atmosphere having a temperature in the range of from 90 to 180° C., preferably in the range of from 110 to 130° C., wherein the gas atmosphere preferably comprises, more preferably is, one or more of air, lean air, and oxygen, more preferably air.

60. The method of embodiment 58 or 59, wherein according to (b.3), drying is performed in a gas atmosphere for a duration in the range of from 10 minutes to 1.5 hours, preferably in the range of from 20 minutes to 50 minutes, wherein the gas atmosphere preferably comprises, more preferably is, one or more of air, lean air, and oxygen, more preferably air.

61. The method of any one of embodiments 58 to 60, wherein, according to (b.4), calcining is performed in a gas atmosphere having a temperature in the range of from 500 to 650° C., wherein the gas atmosphere preferably comprises, more preferably is, one or more of air, lean air, and oxygen, more preferably air.

62. The method of any one of embodiments 57 to 61, wherein (c) comprises
  (c.1) forming a slurry with an aqueous mixture of water, a platinum group metal precursor, preferably of a platinum precursor, and a non-zeolitic oxidic material, and a zeolitic material, preferably having a framework type CHA, and comprising one or more of copper and iron, and preferably adding a precursor of an oxidic binder, more preferably a Zr-containing precursor, more preferably a zirconyl acetate; or forming a slurry with a source of water, a platinum group metal precursor, preferably of a platinum precursor, and a non-zeolitic oxidic material, and a vanadium oxide, preferably vanadium oxalate, and preferably adding an oxidic material, more preferably with a dispersant;
  (c.2) disposing the slurry obtained in (c.1) on the surface of the internal walls over y % of the substrate axial length from the inlet end to the outlet end;
  (c.3) optionally, drying the slurry disposed on the substrate obtained in (c.2), obtaining a dried slurry-treated substrate;
  (c.4) calcining the slurry disposed on the substrate obtained in (c.2), or the dried slurry-treated substrate obtained in (c.3), in a gas atmosphere, preferably having a temperature in the range of from 300 to 600° C., more preferably in the range of from 350 to 550° C., wherein the gas atmosphere preferably comprises, more preferably is, one or more of air, lean air, and oxygen, more preferably air.

63. The method of embodiment 62, wherein according to (c.3) drying is performed in a gas atmosphere having a temperature in the range of from 90 to 180° C., preferably in the range of from 120 to 140° C., wherein the gas atmosphere preferably comprises, more preferably is, one or more of air, lean air, and oxygen, more preferably air.

64. The method of embodiment 62 or 63, wherein, according to (c.3), drying is performed in a gas atmosphere for a duration in the range of from 10 minutes to 1.5 hours, preferably in the range of from 20 minutes to 50 minutes, wherein the gas atmosphere preferably comprises, more preferably is, one or more of air, lean air, and oxygen, more preferably air.

65. The method of any one of embodiments 62 to 64, wherein, according to (c.4), calcining is performed in a gas atmosphere having a temperature in the range of from 350 to 500° C., wherein the gas atmosphere preferably comprises, more preferably is, one or more of air, lean air, and oxygen, more preferably air.

66. The method of any one of embodiments 57 to 65, wherein (d) comprises
  (d.1) forming a slurry comprising water and a zeolitic material, preferably having a framework type CHA, and comprising one or more of copper and iron, and a precursor of an oxidic binder, preferably a Zr-containing precursor, more preferably zirconyl acetate; or forming a slurry with water and a source of a vanadium oxide, preferably vanadium oxalate, and preferably adding an oxidic material, more preferably with a dispersant;
  (d.2) disposing the obtained slurry over x % of the substrate axial length on the second coating from the inlet end to the outlet end, with x preferably being in the range of from 98 to 100, more preferably in the range of from 99 to 100;
  (d.3) optionally drying the slurry disposed on the substrate obtained in (d.2), obtaining a dried slurry-treated substrate;
  (d.4) calcining the slurry disposed on the substrate obtained in (d.2), or the dried slurry-treated substrate obtained in (d.3), in a gas atmosphere, preferably having a temperature in the range of from 300 to 600° C., more preferably in the range of from 350 to 550° C., wherein the gas atmosphere preferably comprises, more preferably is, one or more of air, lean air, and oxygen, more preferably air.

67. The method of embodiment 66, wherein according to (d.3), drying is performed in a gas atmosphere having a temperature in the range of from 90 to 180° C., preferably in the range of from 110 to 130° C., wherein the gas atmosphere preferably comprises, more preferably is, one or more of air, lean air, and oxygen, more preferably air.

68. The method of embodiment 66 or 67, wherein according to (d.4), calcining is performed in a gas atmosphere having a temperature in the range of from 350 to 500° C., wherein the gas atmosphere preferably comprises, more preferably is, one or more of air, lean air, and oxygen, more preferably air.

69. The method of any one of embodiments 57 to 68, wherein y is in the range of from 20 to (100−z), preferably y is (100−z), wherein z preferably is in the range of from 30 to 70, more preferably in the range of from 40 to 60, more preferably in the range of from 45 to 55.

70. The method of any one of embodiments 57 to 69, wherein disposing in one or more of (b), (c) and (d), preferably disposing in (b), (c) and (d), is performed by spraying the slurry onto the substrate or by immersing the substrate into the slurry, preferably by immersing the substrate into the slurry.

71. The method of any one of embodiments 57 to 70, consisting of (a), (b), (c) and (d).

72. A catalyst for the oxidation of NO, for the oxidation of ammonia and for the selective catalytic reduction of NOx, preferably the catalyst for the oxidation of NO, for the oxidation of ammonia and for the selective catalytic reduction of NOx according to any one of embodiments 1 to 56, obtainable or obtained by the process according to any one of embodiments 57 to 71.

73. Use of a catalyst for the oxidation of NO, for the oxidation of ammonia and for the selective catalytic reduction of NOx according to any one of embodiments 1 to 56 and 72 for the simultaneous selective catalytic reduction of NOx, the oxidation of ammonia and the oxidation of NO.

74. An exhaust gas treatment system for treating an exhaust gas stream exiting an internal combustion engine, preferably a diesel engine, said exhaust gas treatment system having an upstream end for introducing said exhaust gas stream into said exhaust gas treatment system, wherein said exhaust gas treatment system comprises the catalyst according to any one of embodiments 1 to 56 and 72 and one or more of a selective catalytic reduction catalyst, an ammonia oxidation catalyst, and a diesel particulate filter.

75. The exhaust gas treatment system of embodiment 74, comprising a first selective catalytic reduction catalyst comprising a coating disposed on a substrate and the catalyst according to any one of embodiments 1 to 56 and 72, wherein the first selective catalytic reduction catalyst is located downstream of the upstream end of the exhaust gas treatment system, wherein the catalyst according to any one of embodiments 1 to 56 and 72 is located downstream of the first selective catalytic reduction catalyst.

76. The exhaust gas treatment system of embodiment 74 or 75, wherein the first selective catalytic reduction catalyst comprises one or more of a vanadium oxide and a zeolitic material comprising one or more of copper and iron.

77. The exhaust gas treatment system of embodiment 75 or 76, further comprising a diesel particulate filter, wherein said filter is located downstream of the catalyst according to any one of embodiments 1 to 56 and 72.

78. The exhaust gas treatment system of embodiment 77, further comprising a second selective catalytic reduction catalyst and an ammonia oxidation catalyst, wherein the second selective catalytic reduction catalyst is located downstream of the diesel particulate filter, and wherein the ammonia oxidation catalyst is located downstream of the second selective catalytic reduction.

79. The exhaust gas treatment system of any one of embodiments 74 to 78, further comprising a first injector for injecting a fluid into the exhaust gas stream exiting the engine, said injector being located upstream of the first selective catalytic reduction catalyst, and downstream of the inlet end of the exhaust gas treatment system, wherein the fluid preferably is an aqueous urea solution.

80. The exhaust gas treatment system of embodiment 79, further comprising a second injector for injecting a fluid into the exhaust gas stream exiting the diesel particulate filter, said injector being located upstream of the second selective catalytic reduction catalyst, and downstream of the diesel particulate filter, wherein the fluid preferably is an aqueous urea solution.

81. The exhaust gas treatment system of any one of embodiments 75 to 80 consisting of the first selective catalytic reduction catalyst, the catalyst according to any one of embodiments 1 to 56 and 72, and preferably a diesel particulate filter as defined in embodiment 77, and more preferably a second selective catalytic reduction catalyst and an ammonia oxidation catalyst as defined in embodiment 78, and more preferably a first and a second injector as defined in embodiments 79 and 80.

82. A method for the simultaneous selective catalytic reduction of NOx, the oxidation of ammonia and the oxidation of nitrogen monoxide, the method comprising
(1) providing a gas stream comprising one or more of NOx, ammonia and nitrogen monoxide;
(2) contacting the gas stream provided in (1) with a catalyst for the oxidation of NO, for the oxidation of ammonia and for the selective catalytic reduction of NOx according to any one of embodiments 1 to 56 and 72.

In the context of the present invention, the term "loading of a given component/coating" (in $g/in^3$ or $g/ft^3$) refers to the mass of said component/coating per volume of the substrate, wherein the volume of the substrate is the volume which is defined by the cross-section of the substrate times the axial length of the substrate over which said component/coating is present. For example, if reference is made to the loading of a first coating extending over x % of the axial length of the substrate and having a loading of X $g/in^3$, said loading would refer to X gram of the first coating per x % of the volume (in $in^3$) of the entire substrate.

Further, in the context of the present invention, a term "X is one or more of A, B and C", wherein X is a given feature and each of A, B and C stands for specific realization of said feature, is to be understood as disclosing that X is either A, or B, or C, or A and B, or A and C, or B and C, or A and B and C. In this regard, it is noted that the skilled person is capable of transfer to above abstract term to a concrete example, e.g. where X is a chemical element and A, B and C are concrete elements such as Li, Na, and K, or X is a temperature and A, B and C are concrete temperatures such as 10° C., 20° C., and 30° C. In this regard, it is further noted that the skilled person is capable of extending the above term to less specific realizations of said feature, e.g. "X is one or more of A and B" disclosing that X is either A, or B, or A and B, or to more specific realizations of said feature, e.g. "X is one or more of A, B, C and D", disclosing that X is either A, or B, or C, or D, or A and B, or A and C, or A and D, or B and C, or B and D, or C and D, or A and B and C, or A and B and D, or B and C and D, or A and B and C and D.

Furthermore, in the context of the present invention, the term "the surface of the internal walls" is to be understood as the "naked" or "bare" or "blank" surface of the walls, i.e. the surface of the walls in an untreated state which consists—apart from any unavoidable impurities with which the surface may be contaminated—of the material of the walls.

In the context of the present invention, the term "consists of" with regard to the weight-% of one or more components indicates the weight-% amount of said component(s) based on 100 weight-% of the entity in question. For example, the wording "wherein from 0 to 0.001 weight-% of the first coating consists of palladium" indicates that among the 100 weight-% of the components of which said coating consists of, 0 to 0.001 weight-% is palladium.

The present invention is further illustrated by the following reference examples, comparative examples and examples.

EXAMPLES

Reference Example 1: Determination of the Dv20, Dv50 and Dv90 Values

The particle size distributions were determined by a static light scattering method using Sympatec HELOS equipment, wherein the optical concentration of the sample was in the range of from 5 to 10%.

Reference Example 2: Measurement of the BET Specific Surface Area

The BET specific surface area was determined according to DIN 66131 or DIN ISO 9277 using liquid nitrogen.

Reference Example 3: General Coating Method

In order to coat the flow-through substrate with one or more coatings, the flow-through substrate was suitably immersed vertically in a portion of a given slurry for a specific length of the substrate which was equal to the targeted length of the coating to be applied. In this manner, the slurry contacted the walls of the substrate.

Comparative Example 1: Preparation of a Catalyst not According to the Present Invention (with a Single Coating)

To a Zr-doped alumina powder (20 weight-% $ZrO_2$, a BET specific surface area of 200 m$^2$/g, Dv90 of 125 microns and a total pore volume of 0.425 ml/g) was added a platinum ammine solution. After calcination at 590° C. the final Pt/Zr-alumina had a Pt content of 1.85 weight-% based on the weight of Zr-alumina. This material was added to water and the slurry was milled until the resulting Dv90 was 10 microns, as described in Reference Example 1. To an aqueous slurry of Cu-CHA zeolitic material (with about 3.75 weight-% of CuO and a $SiO_2$:$Al_2O_3$ molar ratio of about 25) was added a zirconyl-acetate solution to achieve 5 weight-% of $ZrO_2$ after calcination based on the weight of the zeolitic material. The milled Pt/Zr-alumina slurry was added to the Zr/Cu-CHA slurry and mixed. The final slurry was then disposed over the full length of an uncoated honeycomb flow-through cordierite monolith substrate (diameter: 26.67 cm (10.5 inches)×length: 7.62 cm (3 inches) cylindrically shaped substrate with 400/(2.54)$^2$ cells per square centimeter and 0.1 mm (4 mil) wall thickness). Afterwards, the substrate was dried and calcined. The loading of the coating in the catalyst after calcination was about 3.0 g/in$^3$ with a Cu-CHA loading of 2.6 g/in$^3$, a $ZrO_2$ loading of 0.13 g/in$^3$, a Zr-alumina of 0.25 g/in$^3$ a Pt loading of 8 g/ft$^3$.

Comparative Example 2: Preparation of a Catalyst not According to the Present Invention (with Three Coatings)

Third Coating (Outlet Bottom Coating):
To a Si-doped titanic powder (10 weight % $SiO_2$, a BET specific surface area of 200 m$^2$/g and a Dv90 of 20 micrometers) was added a platinum ammine solution, such that the Si-titania had after calcination a Pt content of 1.1 weight-% based on the weight of Si-titania. This material was added to water and the resulting slurry was milled until the resulting Dv90 was 10 microns, as described in Reference Example 1. The resulting slurry was then disposed from the outlet side of an uncoated honeycomb flow-through cordierite monolith substrate toward the inlet side over half of the length of the substrate using the coating method described in Reference Example 3 (diameter: 26.67 cm (10.5 inches)×length: 7.62 cm (3 inches) cylindrically shaped substrate with 400/(2.54)$^2$ cells per square centimeter and 0.1 millimeter (4 mil) wall thickness) to form the third coating. Afterwards, the coated substrate was dried and calcined. The loading of the third coating after calcination was about 0.51 g/in$^3$, including a final platinum loading in the third coating of 10 g/ft$^3$.
Second Coating (Full-Length Middle Coating):
To a Si-doped titania powder (10 weight-% $SiO_2$, a BET specific surface area of 200 m$^2$/g and a Dv90 of 20 micrometers) was added a platinum ammine solution, such that the Si-titania had after calcination a Pt content of 0.35 weight-% based on the weight of Si-titania. This material was added to water and the resulting slurry was milled until the resulting Dv90 was 10 microns, as described in Reference Example 1. To an aqueous slurry of Cu-CHA zeolitic material (5.1 weight-% CuO and a $SiO_2$:$Al_2O_3$ molar ratio of 18) is added a zirconyl-acetate solution to achieve 5 weight % $ZrO_2$ after calcination based on the weight of the zeolitic material. To this Cu-CHA slurry, the Pt-containing slurry was added and stirred, creating the final slurry. The final slurry was then disposed over the full length of the honeycomb cordierite monolith substrate, already coated with the third coating, from the inlet side of the substrate towards the outlet side and covering the third coating using the coating method described in Reference Example 3. Afterwards, the coated substrate was dried and calcined. The loading of the second coating after calcination was 2.5 g/in$^3$, including 1.9 g/in$^3$ of Cu-CHA, 0.1 g/in$^3$ of $ZrO_2$, 0.5 g/in$^3$ of Si—$TiO_2$ and a final platinum loading of 3 g/ft$^3$.
First Coating (Full-Length Top Coating):
To an aqueous slurry of Cu-CHA zeolitic material (5.1 weight-% CuO and a $SiO_2$: $Al_2O_3$ molar ratio of 18) was added a zirconyl-acetate solution to achieve 5 weight % $ZrO_2$ after calcination based on the weight of the zeolitic material. The final slurry was then disposed over the full length of the honeycomb flow-through cordierite monolith substrate, coated with the third and second coatings, from the inlet side of the substrate towards the outlet side and covering the second and third coatings using the coating method described in Reference Example 3. Afterwards, the coated substrate was dried and calcined. The loading of the first coating after calcination was 1.0 g/in$^3$. The final catalytic loading (1$^{st}$, 2$^{nd}$ and 3$^{rd}$ coatings) in the catalyst after calcination was 3.75 g/in$^3$.

Example 1: Preparation of a Catalyst According to the Present Invention (with Three Coatings)

Third Coating (Outlet Bottom Coating):
To a Si-doped titania powder (10 weight-% of $SiO_2$, a BET specific surface area of 200 m$^2$/g and a Dv90 of 20 micrometers) was added a platinum ammine solution, such that the Si-titania had after calcination a Pt content of 0.81 weight-% based on the weight of Si-titania. This material was added to water and the slurry was milled until the resulting Dv90 was 5.2 microns, as described in Reference Example 1. Finally, a colloidal silica binder was mixed into the slurry at a level calculated to be 2.5 weight-% $SiO_2$ (from the binder) after calcination based on the weight of Si-titania. The resulting mixture was then disposed from the outlet side of an uncoated honeycomb flow-through cordierite monolith substrate toward the inlet side over half of the length of the substrate using the coating method described in Reference Example 3 (diameter: 26.67 cm (10.5 inches)× length: 7.62 cm (3 inches) cylindrically shaped substrate with 400/(2.54)$^2$ cells per square centimeter and 0.1 millimeter (4 mil) wall thickness) to form the third coating. Afterwards, the coated substrate was dried and calcined. The loading of the third coating after calcination was about 1 g/in$^3$, including a platinum loading in the third coating of 14 g/ft$^3$.
Second Coating (Inlet Bottom Coating):
To a Si-doped titania powder (10 wt % $SiO_2$, BET specific surface area of 200 m$^2$/g, a Dv90 of 20 microns) was added a platinum ammine solution. After calcination at 590° C. the final Pt/Si-titania had a Pt content of 0.46 weight-% based on the weight of Si-titania. This material was added to water and the slurry was milled until the resulting Dv90 was 10 microns, as described in Reference Example 1. To an aqueous slurry of Cu-CHA zeolitic material (5.1 weight-% CuO and a $SiO_2:Al_2O_3$ molar ratio of 18) was added a zirconyl-acetate solution to achieve 5 weight-% $ZrO_2$ after calcination based on the weight of the zeolitic material. To this Cu-CHA slurry, the Pt-containing slurry was added and stirred, creating the final slurry. The final slurry was then disposed over half the length of the honeycomb cordierite monolith substrate, coated with the third coating, from the inlet side of the substrate towards the outlet side, ensuring that the second coating does not overlap the third coating and using the coating method described in Reference Example 3. Afterwards, the coated substrate was dried and calcined. The loading of the second coating, after calcination was about 2 $g/in^3$ with a Cu-CHA loading of 1.67 $g/in^3$, a $ZrO_2$ loading of 0.08 $g/in^3$, a Si-titania loading of 0.25 $g/in^3$ and a PGM loading of 2 $g/ft^3$.

First Coating (Full-Length Top Coating):

To an aqueous slurry of Cu-CHA zeolitic material (5.1 weight-% CuO and a $SiO_2:Al_2O_3$ molar ratio of 18) was added a zirconyl-acetate solution to achieve 5 weight-% $ZrO_2$ after calcination based on the weight of the zeolitic material. The slurry was then disposed over the full length of the honeycomb cordierite monolith substrate, coated with the third and second coatings, from the inlet side of the substrate towards the outlet side and covering the second and third coatings using the coating method described in Reference Example 3. Afterwards, the coated substrate was dried and calcined. The loading of this first coating after calcination was 1.0 $g/in^3$. The final catalytic loading ($1^{st}$, $2^{nd}$ and $3^{rd}$ coatings) in the catalyst after calcination was about 2.5 $g/in^3$.

Example 2: Preparation of a Catalyst According to the Present Invention (with Three Coatings)

Third Coating (Outlet Bottom Coating):

To a Si-doped titania powder (10 weight-% of $SiO_2$, a BET specific surface area of 200 $m^2/g$ and a Dv90 of 20 microns) was added a platinum ammine solution. After calcination at 590° C. the final Pt/Si-titania had a Pt content of 0.81 weight-% based on the weight of Si-titania. This material was added to water and the slurry was milled until the resulting Dv90 was 5.2 microns, as described in Reference Example 1. Finally, a colloidal silica binder was mixed into the slurry at a level calculated to be 2.5 weight-% after calcination based on the weight of Si-titania. The resulting slurry was then disposed from the outlet end of an uncoated honeycomb flow-through cordierite monolith substrate toward the inlet side over half of the length of the substrate using the coating method described in Reference Example 5 (diameter: 26.67 cm (10.5 inches)×length: 7.62 cm (3 inches) cylindrically shaped substrate with $400/(2.54)^2$ cells per square centimeter and 0.1 millimeter (4 mil) wall thickness) to form the third coating. Afterwards, the coated substrate was dried and calcined. The loading of the third coating in the catalyst after calcination was about 1 $g/in^3$, including a platinum loading of 14 $g/ft^3$.

Second Coating (Inlet Bottom Coating):

To a Si-doped titanic powder (10 weight-% of $SiO_2$, a BET specific surface area of 200 $m^2/g$ and a Dv90 of 20 microns) was added a platinum ammine solution. After calcination at 590° C. the final Pt/Si-titania had a Pt content of 0.46 weight-% based on the weight of Si-titania. This material was added to water and the slurry was milled until the resulting Dv90 was 10 microns, as described in Reference Example 1. To an aqueous slurry of Cu-CHA zeolitic material (5.1 weight-% CuO and a $SiO_2:Al_2O_3$ molar ratio of 18) was added a zirconyl-acetate solution to achieve 5 weight-% $ZrO_2$ after calcination based on the weight of the zeolitic material. To this Cu-CHA slurry, the Pt-containing slurry was added and stirred, creating a final mixture. The final mixture was then disposed over half the length of the honeycomb cordierite monolith substrate, coated with the third coating, from the inlet side of the substrate towards the outlet side, ensuring that the second coating does not overlap the third coating and using the coating method described in Reference Example 3. Afterwards, the coated substrate was dried and calcined. The loading of the second coating after calcination was 1 $g/in^3$ with 0.71 $g/in^3$ of Cu-CHA, 0.25 $g/in^3$ of Si-titania and a PGM loading of 2 $g/ft^3$.

First Coating (Full-Length Top Coating):

To an aqueous slurry of Cu-CHA zeolitic material (5.1 weight-% CuO and a $SiO_2:Al_2O_3$ molar ratio of 18) was added a zirconyl-acetate solution to achieve 5 weight-% $ZrO_2$ after calcination based on the weight of the zeolitic material. The slurry was then disposed over the full length of the honeycomb cordierite monolith substrate, coated with the third and second coatings, from the inlet side of the substrate towards the outlet side and covering the second and third coatings using the coating method described in Reference Example 3. Afterwards, the coated substrate was dried and calcined. The loading of this first coat was 2.0 $g/in^3$. The final catalytic loading ($1^{st}$, $2^{nd}$ and $3^{rd}$ coatings) in the catalyst after calcination was about 3 $g/in^3$.

Example 3: Testing of the Catalysts of Comparative Examples 1 AND 2 and of Examples 1 and 2—DeNOx Performance and $N_2O$ Formation The catalysts were evaluated on a motor test cell. The motor in this case was 6.7 L off-road calibrated engine. In all cases, each catalyst was tested alone, without any upstream oxidation or downstream SCR catalysts. The resulting space velocity was 80 k/h for the SCR test (160 k/h for the highest temperature point). The SCR test was an ammonia to NOx ratio (ANR) sweep test with different stoichiometric ratios between $NH_3$ and NOx evaluated. For the data presented in FIGS. 2 and 3, the NOx conversion is always provided at ANR=1.1 and the $N_2O$ formation at ANR=1.0 (ANR, which is the stoichiometric ammonia to NOx ratio, allows one to determine the correct amount of urea to inject based on the given exhaust mass flow and NOx concentration). Five SCR inlet temperatures were chosen, and the engine conditions set appropriately to reach the targeted space velocities. The catalyst activity was allowed to attain a steady-state equilibrium at each engine load (temperature) and ANR step before moving on to the next step. Both the NOx conversion presented in FIG. 2 and the $N_2O$ formation presented in FIG. 3 were measured on the same test.

FIG. 2 shows that the inventive catalysts of Example 1 and Example 2 exhibit improved DeNOx over a wide temperature range, namely from 200 to 500° C., compared to the catalysts of Comparative Examples 1 and 2 not according to the present invention. In particular, at temperature above 250° C., e.g. from 300 to 500° C., the DeNOx activity of the catalysts comprising a top coating with an SCR-only catalyst is largely improved compared to a catalyst prepared with a single coating of mixed catalysts. At 450° C. (inlet temperature), the catalysts according to the present invention exhibit a DeNOx of about 95% while the catalyst of Comparative Example 1 (a single coating) exhibits a DeNOx of about 50%.

FIG. 3 shows that the catalysts according to the present invention permit to reduce the production of $N_2O$, in particular the concentration of nitrous oxide formed are lower than 15 ppm while with the catalyst of Comparative Example 1, the concentration of $N_2O$ formed is of more than 20 ppm and up to about 60 ppm at about 350° C. Without wanting to be bound to any theory, it is believed that these results show that the top coating comprising a SCR-only catalyst may be necessary to control the oxidation of ammonia at temperature above 250° C.

Example 4: Testing of the Catalysts of Comparative Examples 1 and 2 and of Examples 1 and 2—NO Oxidation The catalysts were evaluated on a motor test cell. The motor in this case was 6.7 L off-road calibrated engine. In all cases, each catalyst was tested alone, without any upstream oxidation or downstream SCR catalysts. The resulting space velocity was 100 k/h for the NOx oxidation test. Prior to this test, the catalysts were degreened in-situ at 450° C. for 2 hours. For the NO oxidation test, the outlet exhaust temperature was increased and decreased step-wise from 200° C. to 500° C. to 200° C. in 25° C. steps while maintaining constant space velocity. Each step was held for 15 minutes to reach equilibrium catalyst conditions. NO oxidation activity is reported as the ratio of $NO_2$ to total NOx (or $NO_2$/NOx %).

FIG. 4 shows that the inventive catalysts of Example 1 and Example 2 exhibit an improved NO oxidation compared to the catalysts of Comparative Examples 1 and 2. This is especially apparent at low temperatures between 200 and 350° C. which is the kinetically controlled region. Furthermore, it is this low temperature region which is most relevant for passive soot oxidation because this condition is most representative of everyday use. At temperatures above 400° C. in the diffusion limited regime, the single coat Comparative Example 1 offers somewhat greater NO oxidation compared with that for Examples 1 and 2, however, the magnitude of the performance difference is not as pronounced as in the kinetically controlled regime.

CITED LITERATURE

Figure 1:
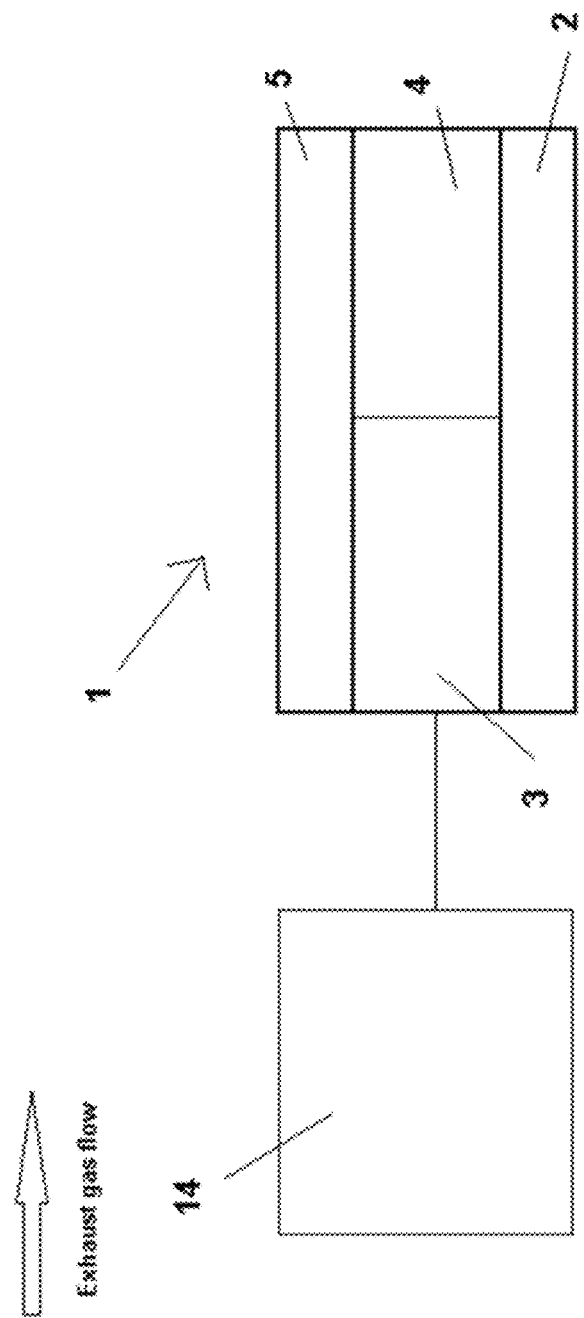
FIG. 1 shows a schematic depiction of a catalyst according to the present invention. In particular, this figure shows a catalyst 1 of the present invention comprises a substrate 2, such as a flow-through substrate, onto which an inlet coating 3, the second coating of the present invention, is disposed over 50% of the substrate axial length from the inlet end to the outlet end of the substrate and an outlet coating 4, the third coating of the present invention, is disposed over 50 of the substrate axial length from the outlet end to the inlet end. The catalyst 1 further comprises a top coating 5 disposed onto the coating 3 (second coating) and the coating 4 (third coating) over the entire length of the substrate. Generally, a selective catalytic reduction catalyst 14 can be present upstream of the catalyst 1.
Figure 2:
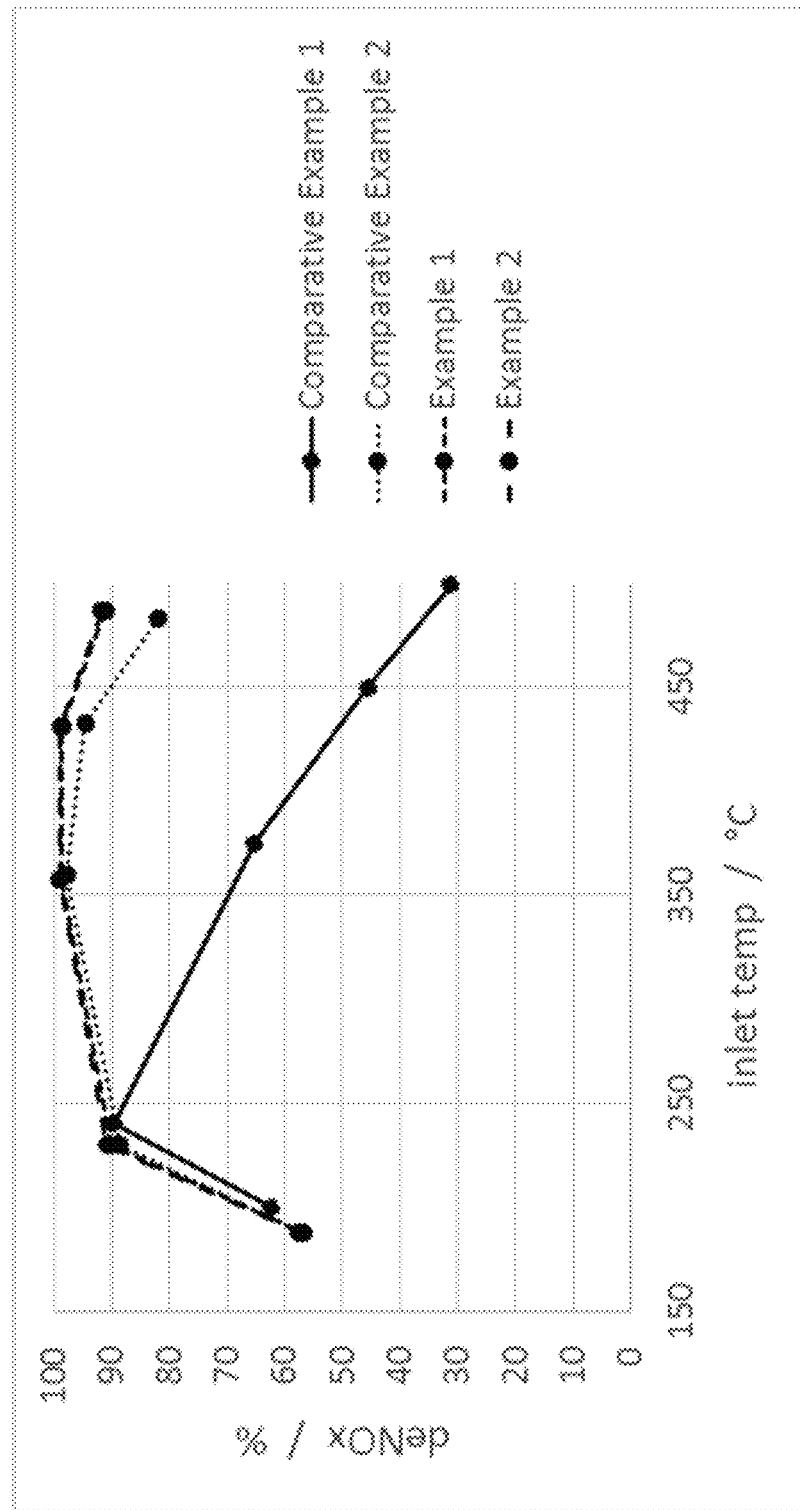
FIG. 2 shows the DeNOx performance of the catalysts of Comparative Examples 1 and 2 and of Examples 1 and 2 at inlet temperatures from about 200 to about 500° C., and at ANR=1.1 and SV of 80 k/h (highest temp point is at 160 k/h).
Figure 3:
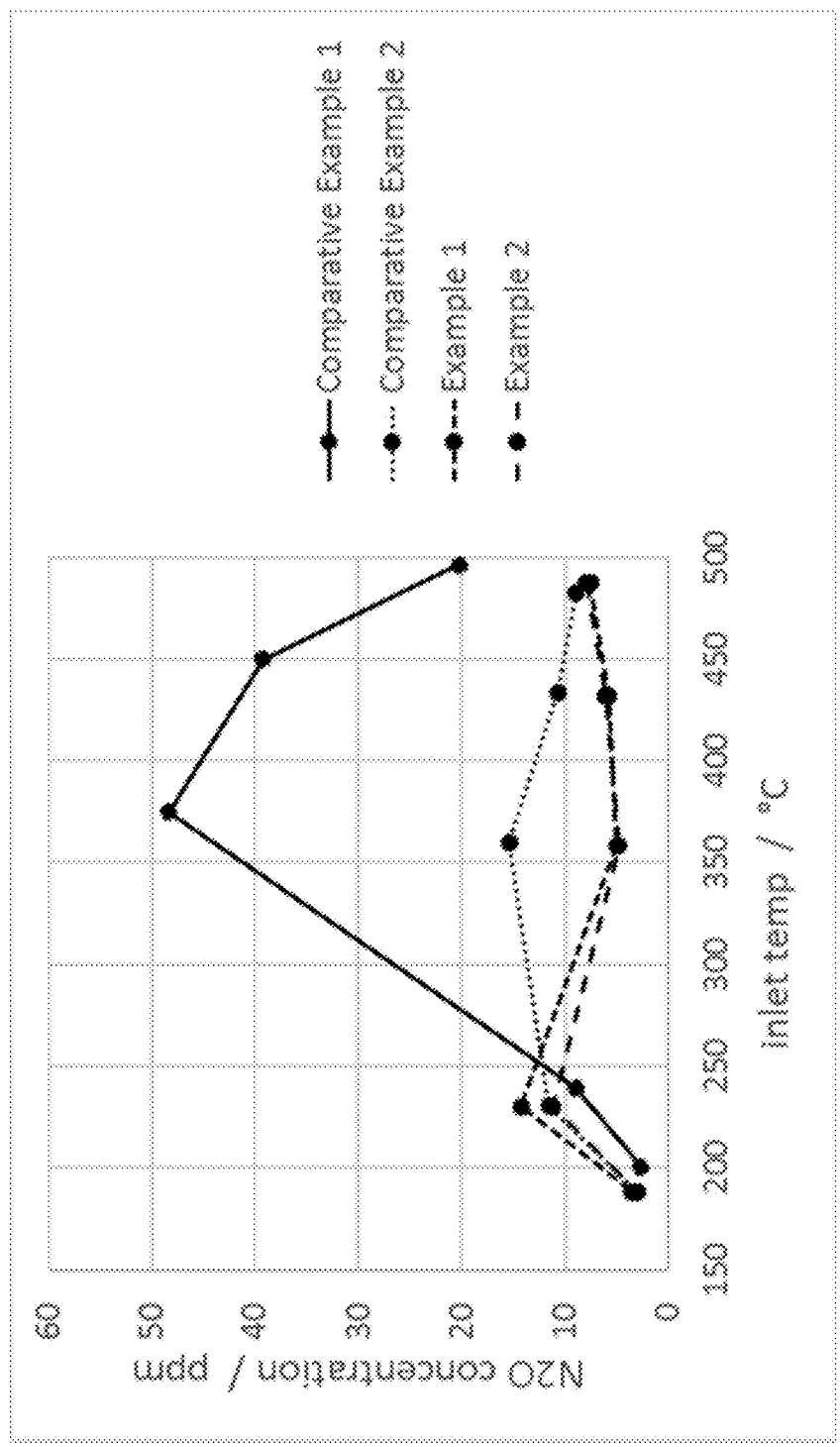
FIG. 3 shows the $N_2O$ formation of the catalysts of Comparative Examples 1 and 2 and of Examples 1 and 2 at inlet temperatures from about 200 to about 500° C. and at ANR=1.0 and SV of 80 k/h (highest temp point is at 160 k/h).
Figure 4:
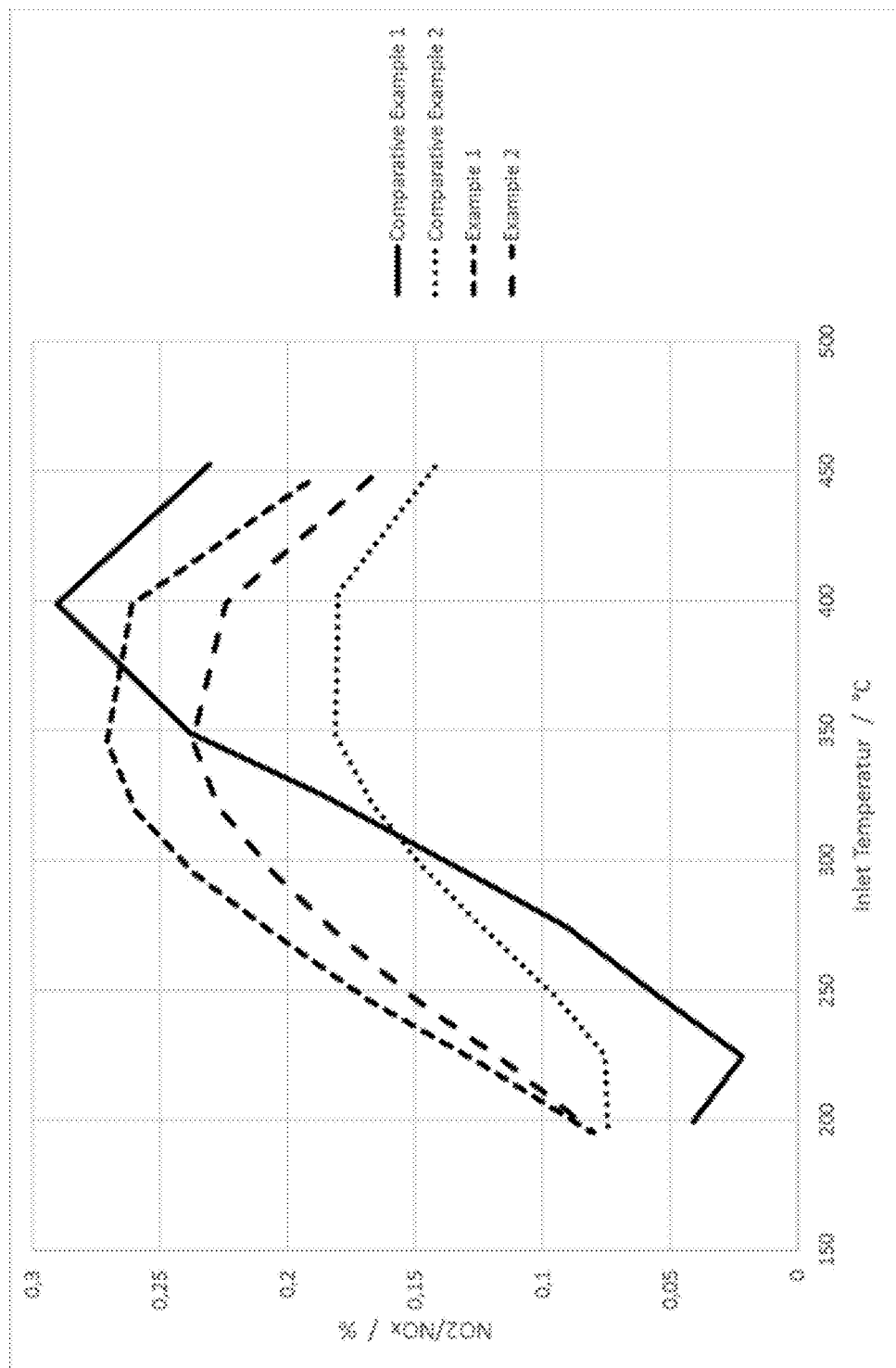
FIG. 4 shows the NO oxidation ($NO_2$/NOX ratio) of the catalysts of Comparative Examples 1 and 2 and of Examples 1 and 2 at inlet temperatures from about 200 to about 450° C. and SV of 100 k/h.

US 2016/0367973
US 2016/0367974

The invention claimed is:

1. A catalyst for the oxidation of NO, for the oxidation of ammonia, and for the selective catalytic reduction of NOx, comprising:
   (i) a flow-through substrate comprising an inlet end, an outlet end, a substrate axial length extending from the inlet end to the outlet end and a plurality of passages defined by internal walls of the flow-through substrate extending therethrough, wherein an interface between the plurality of passages and the internal walls is defined by a surface of the internal walls;
   (ii) a first coating comprising one or more of a vanadium oxide and a zeolitic material comprising one or more of copper and iron;
   (iii) a second coating comprising a platinum group metal component supported on a non-zeolitic oxidic material and further comprising one or more of a vanadium oxide and a zeolitic material comprising one or more of copper and iron; and
   (iv) a third coating comprising a platinum group metal component supported on an oxidic material;
   wherein the third coating is disposed on the surface of the internal walls over z % of the axial length of the substrate from the outlet end to the inlet end, wherein z ranges from 20 to 80;
   wherein the second coating extends over y % of the axial length of the substrate from the inlet end to the outlet end and is disposed on the surface of the internal walls, wherein y ranges from 20 to 80;
   wherein the first coating extends over x % of the axial length of the substrate from the inlet end to the outlet end and is disposed on the second coating and on the third coating, wherein x ranges from 95 to 100.

2. The catalyst of claim 1, wherein y ranges from 20 to (100-z).

3. The catalyst of claim 1, wherein the first coating comprises a zeolitic material comprising one or more of copper and iron; wherein the zeolitic material comprised in the first coating has a framework type chosen from AEI, GME, CHA, MFI, BEA, FAU, MOR, a mixture of two or more thereof, and a mixed type of two or more thereof.

4. The catalyst of claim 1, wherein the first coating comprises a vanadium oxide.

5. The catalyst of claim 1, wherein the first coating has from 0 weight-% to 0.001 weight-% palladium.

6. The catalyst of claim 1, wherein the platinum group metal component of the second coating is one or more of platinum, palladium, and rhodium.

7. The catalyst of claim 1, wherein the second coating comprises the platinum group metal component at a loading, calculated as elemental platinum group metal, ranging from 0.3 g/ft3 to 10 g/ft3;
   wherein the second coating comprises the platinum group metal component at an amount ranging from 0.1 weight-% to 2 weight, based on the weight of the non-zeolitic oxidic material of the second coating.

8. The catalyst of claim 1, wherein the non-zeolitic oxidic material onto which the platinum group metal component of the second coating is supported comprises one or more of alumina, zirconia, titania, silica, ceria, and a mixed oxide comprising two or more of Al, Zr, Ti, Si, and Ce; and wherein the second coating comprises the non-zeolitic oxidic material at a loading ranging from 0.1 g/in$^3$ to 3 g/in$^3$.

9. The catalyst of claim 1, wherein the second coating comprises a zeolitic material comprising one or more of copper and iron; wherein the zeolitic material of the second coating has a framework type chosen from AEI, GME, CHA, MFI, BEA, FAU, MOR, a mixture of two or more thereof, and a mixed type of two or more thereof.

10. The catalyst of claim 1, wherein the second coating and the third coating together have a platinum group metal component loading in the catalyst, calculated as elemental platinum group metal, ranging from 1 g/ft3 to 40 g/ft3.

11. The catalyst of claim 1, wherein the platinum group metal component of the third coating is one or more of platinum, palladium, and rhodium.

12. The catalyst of claim 1, wherein the oxidic material supporting the platinum group metal component of the third coating comprises one or more of alumina, zirconia, titania, silica, ceria, and a mixed oxide comprising two or more of Al, Zr, Ti, Si, and Ce;

wherein from 90 weight-% to 100 weight-% of the oxidic material of the third coating is titania.

13. An exhaust gas treatment system for treating an exhaust gas stream exiting an internal combustion engine, the exhaust gas treatment system having an upstream end for introducing the exhaust gas stream into the exhaust gas treatment system, wherein the exhaust gas treatment system comprises the catalyst according to claim 1 and one or more of a selective catalytic reduction catalyst, an ammonia oxidation catalyst, and a diesel particulate filter.

14. A method for preparing a catalyst for the oxidation of NO, for the oxidation of ammonia, and for the selective catalytic reduction of NOx comprising:

(a) providing an uncoated flow-through substrate, the substrate comprising an inlet end, an outlet end, a substrate axial length extending from the inlet end to the outlet end, and a plurality of passages defined by internal walls of the substrate extending therethrough, wherein an interface between the plurality of passages and the internal walls is defined by [the] a surface of the internal walls;

(b) providing a slurry comprising a platinum group metal component, an oxidic material, and a solvent, disposing the slurry on the surface of the internal walls of the substrate, over z % of the substrate axial length from the outlet end to the inlet end, wherein z ranges from 20 to 80, calcining the slurry disposed on the substrate, obtaining a third coating disposed on the substrate;

(c) providing a slurry comprising a platinum group metal component, a non-zeolitic oxidic material and one or more of a vanadium oxide and a zeolitic material comprising one or more of copper and iron, and a solvent, disposing the slurry on the surface of the internal walls over y % of the substrate axial length from the inlet end to the outlet end, wherein y ranges from 20 to 80, calcining the slurry disposed on the substrate, obtaining a second coating disposed on the substrate; and (d) providing a slurry comprising one or more of a vanadium oxide and a zeolitic material comprising one or more of copper and iron, and a solvent, disposing the slurry over x % of the substrate axial length on the second coating from the inlet end to the outlet end, wherein x ranges from 95 to 100, calcining the slurry disposed on the substrate, obtaining the catalyst for the oxidation of NO, for the oxidation of ammonia and for the selective catalytic reduction of NOx.

15. A catalyst for the oxidation of NO, for the oxidation of ammonia and for the selective catalytic reduction of NOx, prepared by the process according to claim 14.

* * * * *